(12) United States Patent
Zheng et al.

(10) Patent No.: US 10,757,034 B2
(45) Date of Patent: Aug. 25, 2020

(54) QUEUE FLUSHING METHOD AND RELATED DEVICE

(71) Applicant: Huawei Technologies Co., Ltd., Shenzhen (CN)

(72) Inventors: Qin Zheng, Acton, MA (US); Renjie Qu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/907,955

(22) Filed: Feb. 28, 2018

(65) Prior Publication Data
US 2018/0248813 A1 Aug. 30, 2018

(30) Foreign Application Priority Data
Feb. 28, 2017 (CN) .......................... 2017 1 0114413

(51) Int. Cl.
| H04L 12/863 | (2013.01) |
| G06F 12/0875 | (2016.01) |
| H04L 12/851 | (2013.01) |
| H04L 12/861 | (2013.01) |
| H04L 29/08 | (2006.01) |

(52) U.S. Cl.
CPC ........ H04L 47/622 (2013.01); G06F 12/0875 (2013.01); H04L 47/2441 (2013.01); H04L 49/90 (2013.01); H04L 67/2852 (2013.01)

(58) Field of Classification Search
CPC ... H04L 47/622; H04L 47/2441; H04L 49/90; H04L 67/2852; G06F 12/0875
See application file for complete search history.

(56) References Cited

U.S. PATENT DOCUMENTS

| 5,339,407 A | 8/1994 | Goldman et al. |
| 5,687,348 A | 11/1997 | Whittaker |
| 5,848,279 A | 12/1998 | Wu et al. |
| 6,308,242 B1 | 10/2001 | Kim |

(Continued)

FOREIGN PATENT DOCUMENTS

| CN | 101198924 A | 6/2008 |
| CN | 104009935 A | 8/2014 |
| CN | 105162724 A | 12/2015 |

OTHER PUBLICATIONS

Foreign Communication From a Counterpart Application, European Application No. 18158297.4, Extended European Search Report dated Jun. 18, 2018, 8 pages.

(Continued)

*Primary Examiner* — Brian P Cox
(74) *Attorney, Agent, or Firm* — Conley Rose, P.C.

(57) ABSTRACT

A queue flushing method includes scanning, by a queue flushing processor, a flushing status of a valid queue from a queue information table to determine a target queue whose flushing status is "to be flushed" in the queue information table, where the queue information table records the flushing status of the valid queue; modifying, by the queue flushing processor, the flushing status of the target queue to "start flushing"; and flushing, by the queue flushing processor, the target queue, where the flushing status of the target queue is modified to "flushing complete" after the target queue is flushed.

20 Claims, 7 Drawing Sheets

(56) References Cited

U.S. PATENT DOCUMENTS

| | | | |
|---|---|---|---|
| 2003/0061450 A1* | 3/2003 | Mosur | G06F 12/0804 |
| | | | 711/135 |
| 2006/0173970 A1 | 8/2006 | Pope et al. | |
| 2012/0005684 A1* | 1/2012 | Ziarek | G06F 9/528 |
| | | | 718/103 |
| 2015/0264153 A1* | 9/2015 | Anand | H04L 67/2852 |
| | | | 709/212 |
| 2016/0283379 A1* | 9/2016 | Samanta | G06F 12/128 |
| 2018/0159802 A1 | 6/2018 | Bao | |
| 2018/0165020 A1* | 6/2018 | Mazina | G06F 12/0808 |

OTHER PUBLICATIONS

Machine Translation and Abstract of Chinese Publication No. CN104009935, Aug. 27, 2014, 11 pages.
Yang, B., et al, "A Job Scheduling Algorithm Based on Multi-Waiting-Queue in BSP System," Computer and Digital Engineering, vol. 42, No. 9, Sep. 2014, 7 pages.
Foreign Communication From a Counterpart Application, Chinese Application No. 201710114413.6, Chinese Office Action dated Sep. 19, 2019, 6 pages.

* cited by examiner

QUEUE FLUSHING METHOD AND RELATED DEVICE

CROSS-REFERENCE TO RELATED APPLICATIONS

This non-provisional application claims priority to Chinese Patent Application No. 201710114413.6, filed on Feb. 28, 2017, which is hereby incorporated by reference in its entirety.

TECHNICAL FIELD

The disclosure relates to the field of communications technologies, and in particular, to a queue flushing method and a related device.

BACKGROUND

A modern communications device needs to provide a large-capacity data packet cache to absorb a burst data packet. A data packet cached in the communications device constitutes a queue according to a packet descriptor of the data packet, so as to be managed, and is scheduled and sent according to a priority of the queue. To ensure that a data packet of a user is not mistakenly sent to another user, when a user goes off line, a queue including a packet descriptor corresponding to a data packet of the user needs to be flushed before the queue is reallocated to another user. An existing queue flushing manner is as follows. A queue flushing command for a queue that needs to be flushed is issued to a traffic management chip. After receiving the queue flushing command, the traffic management chip waits until the queue that needs to be flushed is scheduled and dequeued. When the queue that needs to be flushed is dequeued, all packet descriptors in the queue that needs to be flushed are removed.

When there are a relatively large quantity of queues that need to be flushed, a queue with a relatively low priority waits a relatively long time to be scheduled and dequeued. As a result, for a long time, the queue with the relatively low priority cannot be scheduled and dequeued, and a flushing completion time of the queue with the relatively low priority cannot be ensured.

SUMMARY

Embodiments of the disclosure disclose a queue flushing method and a related device, so as to resolve a problem that a flushing speed is relatively low when a relatively large quantity of queues need to be flushed.

A first aspect of the embodiments of the disclosure discloses a queue flushing method, including scanning, by a queue flushing processor, a flushing status of a valid queue from a queue information table, and determining a target queue whose flushing status is "to be flushed", where the queue information table is used to record the flushing status of the valid queue; modifying, by the queue flushing processor, the flushing status of the target queue to "start flushing"; and flushing, by the queue flushing processor, the target queue, where the flushing status of the target queue is modified to "flushing complete" after the target queue is flushed.

In this embodiment of the disclosure, a priority of the target queue does not need to be considered, and multiple queues may be simultaneously scanned and flushed. This implements batch flushing of queues and ensures a queue flushing completion time, thereby improving a queue batch flushing capability.

Optionally, after modifying, by the queue flushing processor, the flushing status of the target queue to "start flushing", the method further includes determining, by the queue flushing processor, whether the target queue is in a normal-queue linked list of a scheduler, where the scheduler is configured to schedule a queue in the normal-queue linked list; and if the target queue is not in the normal-queue linked list of the scheduler, adding, by the queue flushing processor, the target queue to a to-be-flushed-queue linked list of the scheduler, and performing the step of flushing the target queue; or if the target queue is in the normal-queue linked list of the scheduler, performing the step of flushing the target queue.

In this embodiment of the disclosure, the target queue can be flushed regardless of whether the target queue is in the normal-queue linked list of the scheduler or in the to-be-flushed-queue linked list of the scheduler, or a part of the target queue is in the normal-queue linked list of the scheduler and the other part of the target queue is in the to-be-flushed-queue linked list of the scheduler.

Optionally, flushing, by the queue flushing processor, the target queue includes reading, by the queue flushing processor, queue identifiers of all currently enqueued queues in the normal-queue linked list and/or the to-be-flushed-queue linked list; and after the queue identifiers of all the currently enqueued queues in the normal-queue linked list and/or the to-be-flushed-queue linked list are all read by the queue flushing processor, receiving, by the queue flushing processor, a flushing complete indication sent by the dequeueing processor, where the flushing complete indication is used to indicate that all currently enqueued queues that need to be flushed in the normal-queue linked list and/or the to-be-flushed-queue linked list are flushed.

The queue flushing processor may read queue identifiers of queues in the normal-queue linked list and/or the to-be-flushed-queue linked list of the scheduler, and send the queue identifiers to the dequeueing processor for a flushing status check. The queue flushing processor and the dequeueing processor complete scheduler flushing scan together.

Optionally, reading, by the queue flushing processor, queue identifiers of all currently enqueued queues in the normal-queue linked list and/or the to-be-flushed-queue linked list includes reading, by the queue flushing processor, a first queue identifier of a first queue in the normal-queue linked list and/or the to-be-flushed-queue linked list, and sending a flushing check request for the first queue identifier to the dequeueing processor, where the flushing check request is used to request the dequeueing processor to check a flushing status of the first queue, and the first queue is any one of all the currently enqueued queues in the normal-queue linked list and/or the to-be-flushed-queue linked list; receiving, by the queue flushing processor, a flushing check result sent by the dequeueing processor, where the flushing check result is used to indicate whether the first queue needs to be flushed; and if the flushing check result indicates that the first queue needs to be flushed and the dequeueing processor has an available flushing engine for flushing the first queue, dequeueing, by the queue flushing processor, the first queue from the normal-queue linked list and/or the to-be-flushed-queue linked list, and reading a queue identifier of a next queue of the first queue in the normal-queue linked list and/or the to-be-flushed-queue linked list; if the flushing check result indicates that the first queue needs to be flushed and the dequeueing processor has no available flushing engine for flushing the first queue, adding, by the queue flushing processor, the first queue to the to-be-flushed-queue linked list, and reading a queue identifier of a next queue of the first queue in the normal-queue linked list and/or the to-be-flushed-queue linked list; or if the flushing check result indicates that the first queue does not need to be flushed, reading, by the queue flushing processor, a queue identifier of a next queue of the first queue in the normal-queue linked list and/or the to-be-flushed-queue linked list.

After scheduler flushing scan is started, a queue subsequently entering the normal-queue linked list is not scanned. This can ensure a completion time of scheduler flushing scan. The queue flushing processor and the dequeueing processor complete scheduler flushing scan together, and in this way, an operation of scheduler flushing scan can be completed without affecting normal scheduling performed by the scheduler.

Optionally, the method further includes receiving, by the queue flushing processor, a flushing command for at least one queue, and recording, in the queue information table, a flushing status of the at least one queue as "to be flushed".

Optionally, after recording, in the queue information table, a flushing status of the at least one queue as "to be flushed", the method further includes discarding, by the queue flushing processor, a data packet when the data packet is enqueued into the at least one queue; and discarding, by the queue flushing processor, a data packet scheduling instruction when receiving the data packet scheduling instruction for the at least one queue.

After a queue enters a flushing procedure, an enqueueing operation cannot be performed on the queue, and a new data packet scheduling instruction for the queue cannot be received either. This can ensure that, during a flushing process, the queue can be unaffected by a new scheduling operation.

Optionally, after flushing, by the queue flushing processor, the target queue, the method further includes scanning, by the queue flushing processor, the flushing status of the target queue in the queue information table, and checking whether there is a queue whose flushing status is "start flushing" in the target queue; and if there is the queue whose flushing status is "start flushing" in the target queue, modifying, by the queue flushing processor, the queue whose flushing status is "start flushing" in the target queue to "flushing complete".

Queue flushing status modification is likely to be omitted during scheduler flushing scan. Therefore, cleanup scan is performed once after the scheduler flushing scan, to ensure that a queue that needs to be flushed is completely flushed.

A second aspect of the embodiments of the disclosure discloses a queue flushing method, including receiving, by a dequeueing processor, a flushing check request that is sent by a queue flushing processor and that is for a first queue identifier; reading, by the dequeueing processor from a queue information table, a flushing status of a first queue corresponding to the first queue identifier; and when the flushing status of the first queue is "start flushing", sending, by the dequeueing processor, a flushing check result to the queue flushing processor, removing a packet descriptor from the first queue by using a configured flushing engine, and reclaiming the packet descriptor, where the flushing check result is used to indicate whether the first queue needs to be flushed.

The dequeueing processor may remove, by using the configured flushing engine, a packet descriptor from a target queue that needs to be flushed, instead of waiting for the packet descriptor to be normally scheduled and dequeued from the target queue that needs to be flushed. The dequeueing processor may proactively perform queue flushing by using the flushing engine, with no need to consider a priority of the target queue. This ensures a target queue flushing completion time, thereby improving a queue flushing capability.

Optionally, removing, by the dequeueing processor, a packet descriptor from the first queue by using a configured flushing engine, and reclaiming the packet descriptor includes removing, by the dequeueing processor, the packet descriptor from the first queue by using the configured flushing engine, and reclaiming the packet descriptor from a packet descriptor cache.

The packet descriptor is reclaimed. The reclaimed packet descriptor may be allocated to a newly enqueued data packet to improve packet descriptor utilization. Because a packet descriptor includes an address of a data packet in a packet cache, packet cache storage space can be reused by means of packet descriptor reclaiming.

Optionally, after removing, by the dequeueing processor, the packet descriptor from the first queue by using the configured flushing engine, and reclaiming the packet descriptor from a packet descriptor cache, the method further includes modifying, by the dequeueing processor, the flushing status of the first queue to "flushing complete"; and after all queues that need to be flushed are flushed, sending, by the dequeueing processor, a flushing complete indication to the queue flushing processor, where the flushing complete indication is used to indicate to the queue flushing processor that a flushing operation on all the queues that need to be flushed is completed.

A third aspect of the embodiments of the disclosure discloses a queue flushing processor, including a first scan unit configured to scan a flushing status of a valid queue from a queue information table; a determining unit configured to determine a target queue whose flushing status is "to be flushed", where the queue information table is used to record the flushing status of the valid queue; a processing unit configured to modify the flushing status of the target queue to "start flushing"; and a flushing unit configured to flush the target queue, where the flushing status of the target queue is modified to "flushing complete" after the target queue is flushed.

Optionally, the queue flushing processor further includes a judging unit configured to determine whether the target queue is in a normal-queue linked list of a scheduler, where the scheduler is configured to schedule a queue in the normal-queue linked list; and an adding unit configured to add the target queue to a to-be-flushed-queue linked list of the scheduler when a determining result obtained by the judging unit is that the target queue is not in the normal-queue linked list of the scheduler, where the flushing unit is further configured to flush the target queue after the adding unit adds the target queue to the to-be-flushed-queue linked list of the scheduler; and the flushing unit is further configured to flush the target queue when the determining result obtained by the judging unit is that the target queue is in the normal-queue linked list of the scheduler.

Optionally, the flushing unit includes a reading subunit configured to read queue identifiers of all currently enqueued queues in the normal-queue linked list and/or the to-be-flushed-queue linked list; and a receiving subunit, configured to receive, after the queue identifiers of all the currently enqueued queues in the normal-queue linked list and/or the to-be-flushed-queue linked list are all read by the queue flushing processor, a flushing complete indication sent by the dequeueing processor, where the flushing complete indication is used to indicate that all currently enqueued queues that need to be flushed in the normal-queue linked list and/or the to-be-flushed-queue linked list are flushed.

Optionally, the reading subunit includes a first processing subunit configured to read a first queue identifier of a first queue in the normal-queue linked list and/or the to-be-flushed-queue linked list, and send a flushing check request for the first queue identifier to the dequeueing processor, where the flushing check request is used to request the dequeueing processor to check a flushing status of the first queue, and the first queue is any one of all the currently enqueued queues in the normal-queue linked list and/or the to-be-flushed-queue linked list; a second processing subunit configured to receive a flushing check result sent by the dequeueing processor, where the flushing check result is used to indicate whether the first queue needs to be flushed; a third processing subunit configured to, when the flushing check result indicates that the first queue needs to be flushed and the dequeueing processor has an available flushing engine for flushing the first queue, dequeue the first queue from the normal-queue linked list and/or the to-be-flushed-queue linked list, and read a queue identifier of a next queue of the first queue in the normal-queue linked list and/or the to-be-flushed-queue linked list; a fourth processing subunit configured to, when the flushing check result indicates that the first queue needs to be flushed and the dequeueing processor has no available flushing engine for flushing the first queue, add the first queue to the to-be-flushed-queue linked list, and read a queue identifier of a next queue of the first queue in the normal-queue linked list and/or the to-be-flushed-queue linked list; and a fifth processing subunit configured to read a queue identifier of a next queue of the first queue in the normal-queue linked list and/or the to-be-flushed-queue linked list when the flushing check result indicates that the first queue does not need to be flushed.

Optionally, the queue flushing processor further includes a receiving unit configured to receive a flushing command for at least one queue, and record, in the queue information table, a flushing status of the at least one queue as "to be flushed".

Optionally, the queue flushing processor further includes a discarding unit configured to discard a data packet when the data packet is enqueued into the at least one queue, where the discarding unit is further configured to discard a data packet scheduling instruction when receiving the data packet scheduling instruction for the at least one queue.

Optionally, the queue flushing processor further includes a second scan unit configured to scan the flushing status of the target queue in the queue information table, and check whether there is a queue whose flushing status is "start flushing" in the target queue, where the processing unit is further configured to modify the queue whose flushing status is "start flushing" in the target queue to "flushing complete" when the second scan unit scans the queue whose flushing status is "start flushing".

A fourth aspect of the embodiments of the disclosure discloses a dequeueing processor, including a receiving unit configured to receive a flushing check request that is sent by a queue flushing processor and that is for a first queue identifier, a reading unit configured to read, from a queue information table, a flushing status of a first queue corresponding to the first queue identifier, a sending unit configured to send a flushing check result to the queue flushing processor when the flushing status of the first queue is "start flushing", where the flushing check result is used to indicate whether the first queue needs to be flushed; and a flushing unit configured to, when the flushing status of the first queue is "start flushing", remove a packet descriptor from the first queue by using a configured flushing engine, and reclaim the packet descriptor.

Optionally, a manner in which the flushing unit removes the packet descriptor from the first queue by using the configured flushing engine and reclaims the packet descriptor includes removing, by the flushing unit, the packet descriptor from the first queue by using the configured flushing engine, and reclaiming the packet descriptor from a packet descriptor cache.

Optionally, the dequeueing processor further includes a processing unit configured to modify the flushing status of the first queue to "flushing complete", where the sending unit is further configured to send a flushing complete indication to the queue flushing processor after all queues that need to be flushed are flushed, where the flushing complete indication is used to indicate to the queue flushing processor that a flushing operation on all the queues that need to be flushed is completed.

A fifth aspect of the embodiments of the disclosure discloses a computer readable storage medium, where the computer readable storage medium stores one or more computer programs, and the queue flushing processor runs the one or more computer programs to execute the queue flushing method according to the first aspect. Repetition is omitted herein.

A sixth aspect of the embodiments of the disclosure discloses a computer readable storage medium, where the computer readable storage medium stores one or more computer programs, and the queue flushing processor runs the one or more computer programs to execute the queue flushing method according to the second aspect. Repetition is omitted herein.

In the embodiments of the disclosure, the queue flushing processor scans the flushing status of the valid queue from the queue information table, determines the target queue whose flushing status is "to be flushed", and modifies the flushing status of the target queue to "start flushing", where the queue information table is used to record the flushing status of the valid queue, and the flushing status of the target queue is modified to "flushing complete" after the target queue is flushed. In the embodiments of the disclosure, when a relatively large quantity of queues need to be flushed, a queue priority does not need to be considered, and multiple queues may be simultaneously scanned and flushed. This implements batch flushing of queues and ensures a queue flushing completion time, thereby improving a queue batch flushing capability.

BRIEF DESCRIPTION OF DRAWINGS

To describe the technical solutions in the embodiments of the disclosure more clearly, the following briefly describes the accompanying drawings for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following describes the embodiments of the disclosure with reference to accompanying drawings.

For a better understanding of the embodiments of the disclosure, the following first describes a system architecture disclosed in an embodiment of the disclosure.

Figure 1:
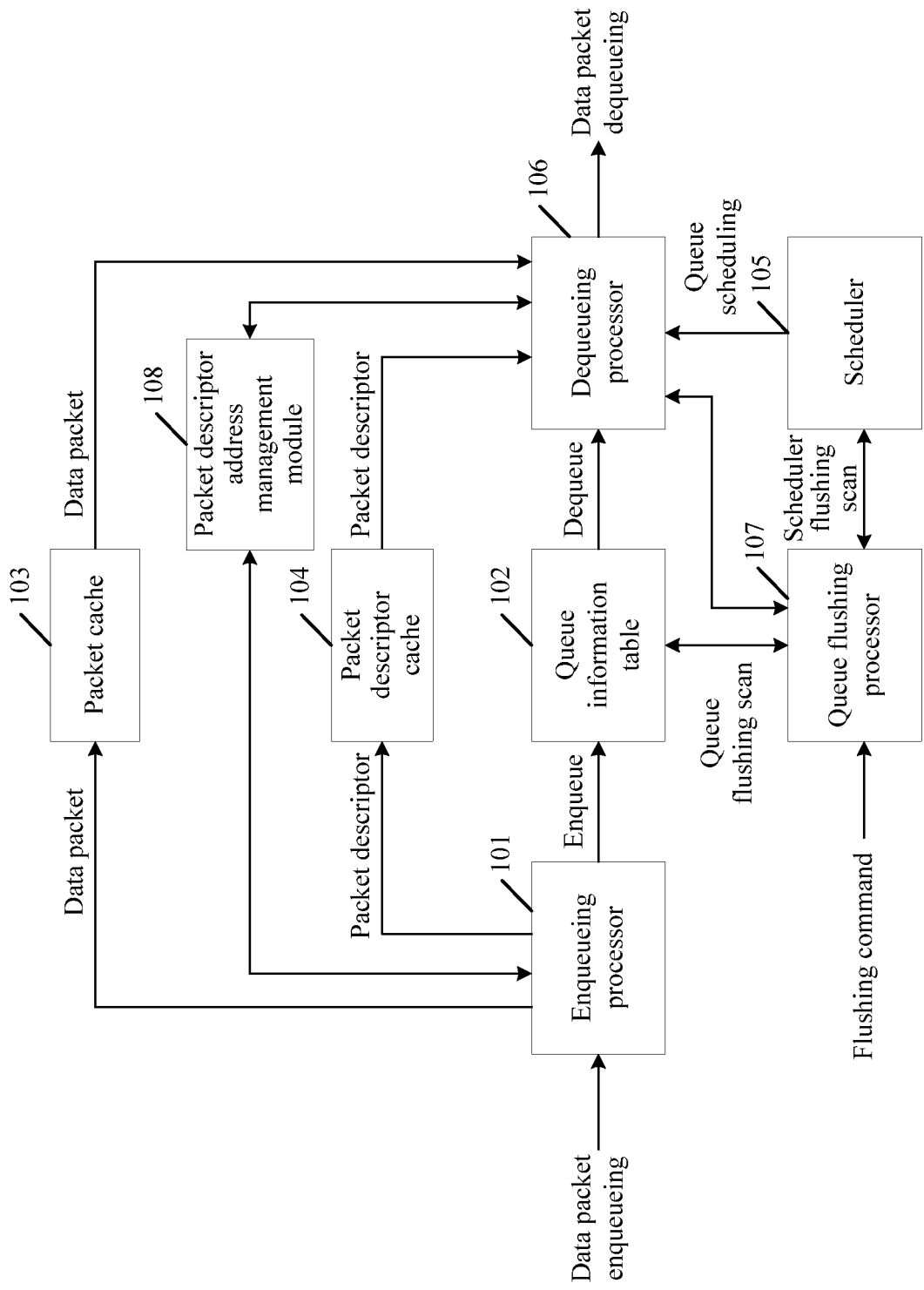
FIG. 1 is a schematic diagram of a system architecture according to an embodiment of the disclosure.
Figure 2:
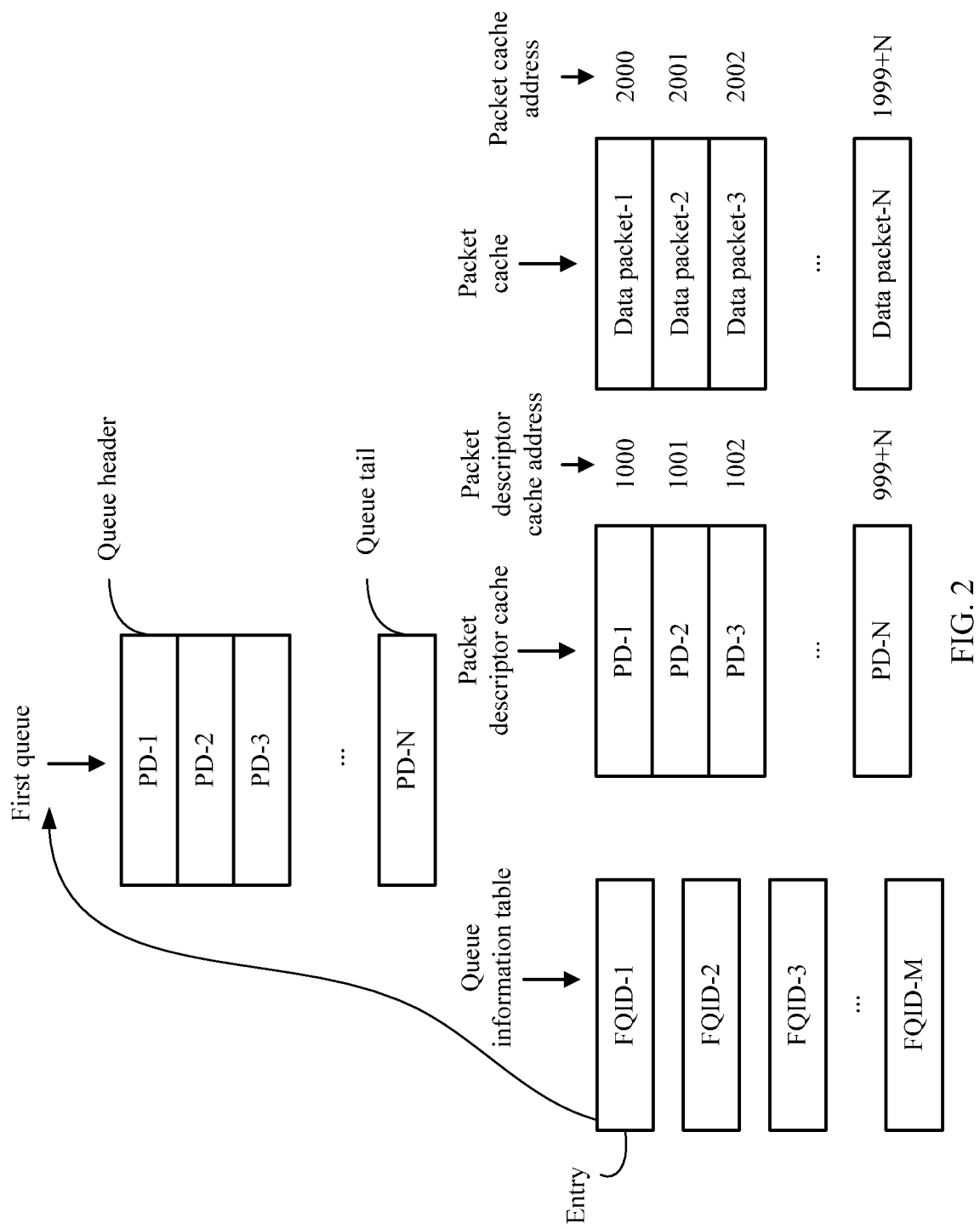
FIG. 2 is a schematic structural diagram of a queue information table, a packet descriptor cache, and a packet cache according to an embodiment of the disclosure.

Referring to FIG. 1 and FIG. 2, FIG. 1 is a schematic diagram of a traffic management system architecture according to an embodiment of the disclosure. As shown in FIG. 1, the system architecture includes an enqueueing processor (or EP) 101, a queue information table (or FQIT) 102, a packet cache (or PM) 103, a packet descriptor cache (or PDM) 104, a scheduler (or SCH) 105, a dequeueing processor (or DP) 106, a queue flushing processor (or FP) 107, and a packet descriptor address management module 108.

FIG. 2 is a schematic structural diagram of a queue information table, a packet descriptor cache, and a packet cache according to an embodiment of the disclosure. As shown in FIG. 2, the queue information table may include multiple rows of entries. Each entry row corresponds to information about one queue. For example, a first row corresponds to information about a first queue, where the information about the first queue may include a first queue identifier (FQID-1), a length of the first queue, a head pointer and a tail pointer of the first queue, a flushing status of the first queue, and the like; a second row is corresponding to information about a second queue, where the information about the second queue may include a second queue identifier (FQID-2), a length of the second queue, a head pointer and a tail pointer of the second queue, a flushing status of the second queue, and the like; . . . ; and an $M^{th}$ row is corresponding to information about an $M^{th}$ queue. The queue information table may be stored in a nonvolatile memory (for example, a nonvolatile random access memory (NVRAM)). An element in a queue in this embodiment of the disclosure is a packet descriptor. That is, the queue is constituted by stringing packet descriptors by using a linked list. The element in the queue conforms to a first-in-first-out principle. A queue header in the queue is used to delete an element (element dequeueing), and a queue tail in the queue is used to insert a new element (element enqueueing). Each queue in this embodiment of the disclosure is constituted by a string of packet descriptors (PDs). The first queue corresponding to the first queue identifier in FIG. 2 is constituted by a total of N packet descriptors, for example, a PD-1, a PD-2, . . . , and a PD-N. The PD in the queue is stored in a packet descriptor cache. Each PD includes an address of a data packet in a packet cache, a packet descriptor pointer (for example, pointing to an address, in the packet descriptor cache, of a next packet descriptor in the queue), a data packet length, and the like. For example, as shown in FIG. 2, an address length in FIG. 2 is, for example, 16 bits. The PD-1 includes an address (for example, 1000) of the PD-1 in the packet descriptor cache, a packet descriptor pointer (for example, the pointer points to an address 1003, that is, in the first queue, a next PD of the PD-1 is a PD-4), and a data packet length (for example, 100 bits). The PD-2 includes an address (for example, 1001) of the PD-2 in the packet descriptor cache, a packet descriptor pointer (for example, the pointer points to an address 1005, that is, in the first queue, a next packet descriptor of the PD-2 is a PD-6), and a data packet length (for example, 100 bits). The packet cache stores a data packet corresponding to a PD. For example, a data packet-1 is stored in a packet descriptor address 2000, a data packet-2 is stored in a packet descriptor address 2001, a data packet-3 is stored in a packet descriptor address 2002, and so on. There is a one-to-one correspondence between a PD and a data packet. As shown in FIG. 2, the PD-1 corresponds to the data packet-1, the PD-2 corresponds to the data packet-2, and so on.

As shown in FIG. 1, the enqueueing processor 101 is configured to write a received data packet into the packet cache 103, allocate a PD to the data packet, write the PD into the packet descriptor cache 104, and link the PD to a queue tail of a corresponding queue in the queue information table 102. The PD includes information such as a packet length of the data packet and an address of the data packet in the packet cache 103.

The queue information table 102 is used to store queue-related information (for example, the queue-related information may include a queue length, a queue identifier, and the like), a head pointer and a tail pointer of a queue, a flushing status of a queue, and the like. When a data packet is enqueued, the enqueueing processor 101 links a PD of the newly enqueued data packet to a queue tail of a queue. In this case, a queue tail pointer of the queue in the queue information table 102 points to an address, in the packet descriptor cache, of the newly enqueued packet descriptor in the queue. When a data packet is dequeued, the dequeueing processor 106 reads a PD from a queue header of a queue. In this case, a queue head pointer of the queue in the queue information table 102 points to an address, in the packet descriptor cache, of a next PD in the queue. The queue information table 102 may store queue-related information (for example, queue headers, queue tails, queue lengths, and the like) of multiple queues. The queue information table 102 may be stored in a memory (for example, a nonvolatile memory).

The packet cache 103 is configured to store a data packet corresponding to a PD in a queue.

The packet descriptor cache 104 is configured to store a PD in a queue.

The scheduler 105 is configured to determine a to-be-dequeued queue according to an emptiness status of the queue and a scheduling policy. A queue linked list may be stored in the scheduler. The queue linked list can be constituted by stringing multiple queues. Each element in the queue linked list is a queue identifier. The queue linked list is also referred to as "a queue of queues".

The dequeueing processor 106 is configured to, after reading packet data from the packet cache 103 according to a PD in a queue header of a to-be-dequeued queue, send the packet data to an interface module for data sending.

The queue flushing processor 107 is configured to receive a queue flushing command issued by software, and scan the queue information table 102 and the queue linked list in the scheduler 105 to implement a queue flushing function.

The packet descriptor address management module 108 is configured to receive a reclaimed PD from the dequeueing processor 107. The dequeueing processor 107 may reclaim PDs from a queue that is normally scheduled by the scheduler 105 and dequeued and a flushed queue. These reclaimed PDs may be allocated by the enqueueing processor 101 to a newly enqueued data packet for use. One or more reclaimed queues may be stored in the packet descriptor address management module 108. The reclaimed queue is a queue constituted by a reclaimed PD. When a new data packet is enqueued, a PD in a queue header of the reclaimed queue may be dequeued, and be allocated by the enqueueing processor 101 to the newly enqueued data packet. When a reclaimed PD is enqueued, the reclaimed PD may be placed at a queue tail of the reclaimed queue.

When a data packet is enqueued, the enqueueing processor 101 writes the received data packet into the packet cache 103, allocates a PD to the data packet (one or more PDs may be allocated according to a size of the data packet), writes the PD into the packet descriptor cache 104 (that is, in the packet descriptor cache 104, one storage space is allocated for packet descriptor storage), and links the PD to a queue tail of a corresponding queue in the queue information table 102. When the scheduler 105 schedules the queue (in which the data packet is located) to be dequeued from the queue linked list, the dequeueing processor 106 reads the data packet from the packet cache 103 according to a PD (for example, starting from a packet descriptor in a queue header of the queue) in the queue, and then sends the data packet to the interface module for data sending, so as to release storage space occupied by the data packet in the packet cache 103. After data packets corresponding to all PDs in the queue are all sent, the dequeueing processor 106 reads and reclaims all the PDs in the queue from the packet descriptor cache 104 (that is, notifies the packet descriptor address management module 108 that all the PDs in the queue can be used as packet descriptors of a newly enqueued data packet). When a data packet is normally dequeued, after the data packet is sent, the dequeueing processor 106 may immediately reclaim a PD corresponding to the data packet. Each PD includes an address of a data packet in the packet cache 103, and is used to store the data packet that is in the address. After a PD is used to store a data packet, the PD can be reclaimed for storage of a new data packet only after the data packet is transmitted out or removed. Because a PD includes an address of a data packet in the packet cache 103, storage space in the packet cache 103 can be reused by means of PD reclaiming.

A PD in this embodiment of the disclosure may be reclaimed. After a data packet corresponding to the PD is sent, the PD may be allocated to a newly enqueued data packet.

When a queue is flushed, the queue flushing processor 107 reads a queue identifier of each queue in the queue linked list in the scheduler 105, and sends the read queue identifier to the dequeueing processor 106. The dequeueing processor 106 reads, from the queue information table, a flushing status of the queue corresponding to the queue identifier. When the flushing status of the queue is "start flushing", the dequeueing processor 106 removes a PD from the queue, and reclaims the PD (for example, notifies the packet descriptor address management module 108 that all PDs in the first queue can be used as PDs of a newly enqueued data packet). After all the PDs in the queue are removed and reclaimed, the dequeueing processor 106 modifies the flushing status of the queue to "flushing complete", that is, flushing of the queue is complete. When the queue is flushed, the dequeueing processor 106 does not need to process a data packet corresponding to all the PDs in the queue (because an old data packet is replaced by a new data packet when a PD is reused, provided that the PD is reclaimed). Because all the PDs in the queue occupy storage space in the packet cache 103, the storage space in the packet cache 103 can be reused by means of packet descriptor reclaiming.

After all queues that need to be flushed are flushed, the dequeueing processor 106 sends a flushing complete indication to the queue flushing processor 107. The flushing complete indication is used to indicate to the queue flushing processor 107 that a flushing operation on all the queues that need to be flushed is completed.

Figure 3:
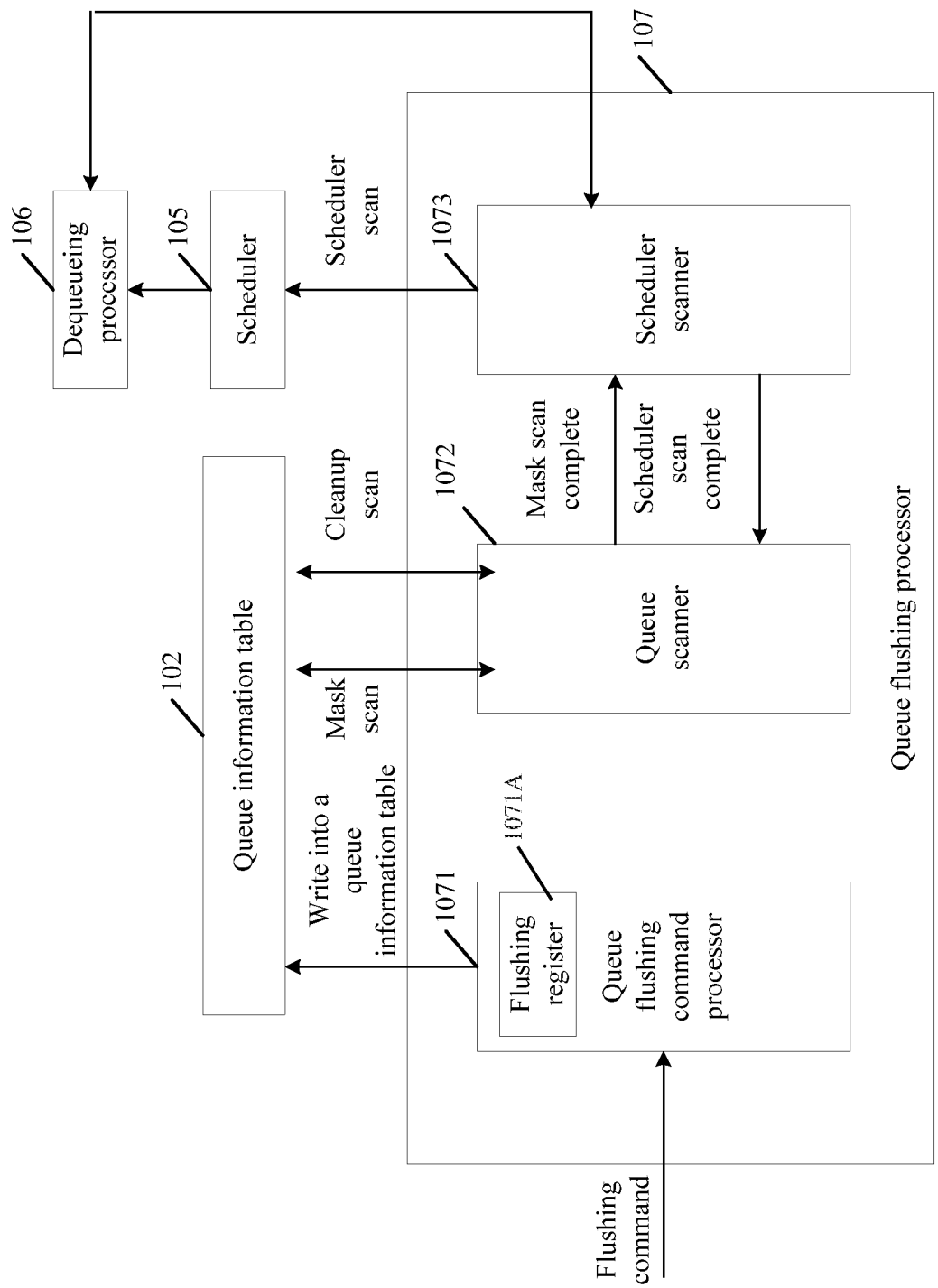
FIG. 3 is a schematic diagram of an architecture of a queue flushing processor according to an embodiment of the disclosure.

Referring to FIG. 3, FIG. 3 is a schematic diagram of an architecture of a queue flushing processor 107 according to an embodiment of the disclosure. As shown in FIG. 3, the queue flushing processor 107 includes a queue flushing command processor (or FCP) 1071, a queue scanner (or QS) 1072, and a scheduler scanner (or SS) 1073.

The queue flushing command processor 1071 is configured to receive and record a queue flushing command issued by software. The queue flushing command processor 1071 may include a flushing register 1071A. The flushing register 1071A is configured to record and store the queue flushing command issued by the software.

The queue scanner 1072 is configured to perform scan on a queue status in a queue information table, for example, mask scan and cleanup scan.

The scheduler scanner 1073 is configured to scan a queue linked list in a scheduler, and send a queue identifier of a queue in the queue linked list to the dequeueing processor 106 for a flushing check.

Figure 4:
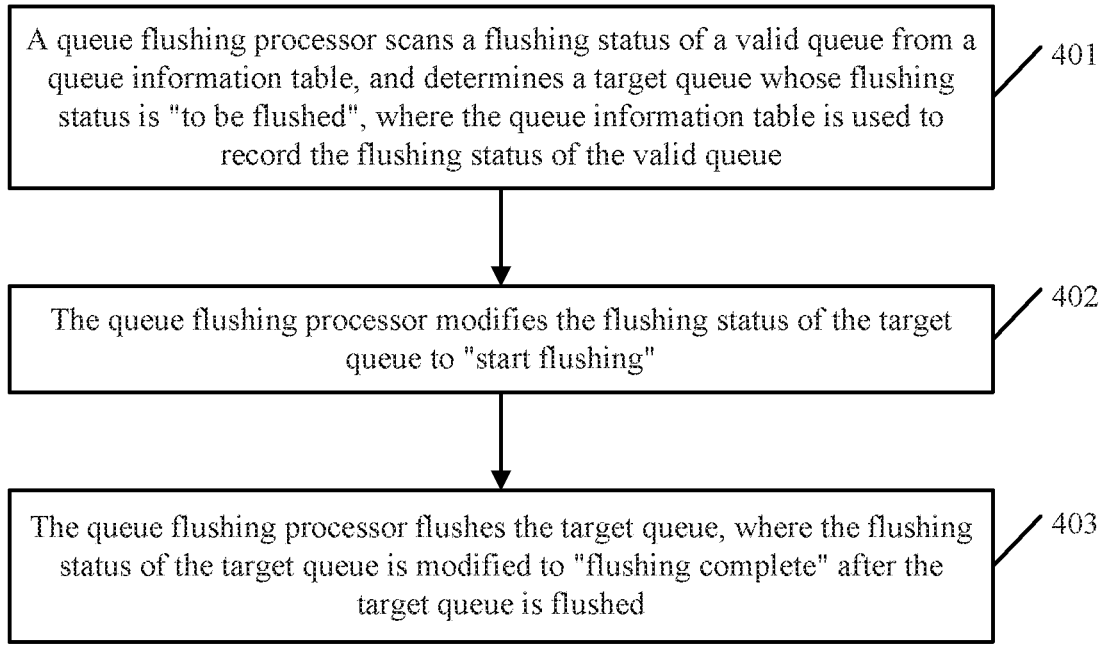
FIG. 4 is a schematic flowchart of a queue flushing method according to an embodiment of the disclosure.

Based on the schematic architecture diagrams shown in FIG. 1, FIG. 2, and FIG. 3, a queue flushing method is disclosed in FIG. 4. Referring to FIG. 4, FIG. 4 is a schematic flowchart of a queue flushing method according to an embodiment of the disclosure. As shown in FIG. 4, the queue flushing method includes the following steps.

401: A queue flushing processor scans a flushing status of a valid queue from a queue information table, and determines a target queue whose flushing status is "to be flushed", where the queue information table is used to record the flushing status of the valid queue.

In this embodiment of the disclosure, the queue flushing processor may read queue information of valid queues one by one from the queue information table, and scan flushing statuses of the valid queues. Generally, the flushing status of the valid queue may be classified into three types, for example, "to be flushed", "start flushing", and "flushing complete". In specific implementation, the flushing status of the valid queue may be identified by using a binary value of a flushing status identifier. For example, a flushing status identifier "01" represents "to be flushed", a flushing status identifier "10" represents "start flushing", and a flushing status identifier "11" represents "flushing complete".

The valid queue may be a preset queue. For example, the preset queue may be a queue within a software-configured range of queues that need to be flushed. The queues within the range are scanned, and a queue beyond the range is not scanned. The valid queue may also be identified by using a validity identifier of each queue in the queue information table. For example, when the validity identifier is "0", it indicates that the queue is an invalid queue; when the validity identifier is "1", it indicates that the queue is a valid queue. Generally, a valid queue is opposite to an invalid queue. A valid queue is a queue on which enqueueing and dequeueing is being performed, whereas an invalid queue is an empty queue or a queue with a scheduling error. An invalid queue generally does not have a flushing status.

The queue flushing processor requires specific duration for scanning the flushing status of the valid queue from the queue information table. The duration taken for the queue flushing processor to scan the flushing status of the valid queue from the queue information table is referred to as a first time interval, and the first time interval may be determined according to a quantity of valid queues and a processing capability of the queue flushing processor. For example, the first time interval is denoted by T_mask_scan, the quantity of valid queues is denoted by Total_fq_number, and duration for scanning one queue is set to T_mask_scan_interval. In an example, the first time interval T_mask_scan=Total_fq_number×T_mask_scan_interval. A magnitude of T_mask_scan_interval may be set according to a processing capability of a chip (for example, a traffic management chip). For example, the processing capability of the chip is, for example, one queue can be scanned per clock beat. In this case, T_mask_scan_interval=64 clock beats may be set, to limit a scan-occupied chip processing capability to 1/64 of the processing capability of the chip. Setting T_mask_scan_interval to 64 clock beats can prevent the scan-occupied processing capability from affecting other normal processing (for example, queue dequeueing, enqueueing, scheduling, and the like) performed by the chip.

For example, it is assumed that a chip frequency is 500 megahertz (MHz), and the quantity of valid queues Total_fq_number is 512 K, where K represents 1024. In this case, a time of each clock beat is 1/500 MHz=2 nanoseconds (ns), and the first time interval T_mask_scan=Total_fq_number×T_mask_scan_interval=512×1024×64×2 ns=67.1 milliseconds (ms).

The queue in this embodiment of the disclosure may be classified into the following six types according to a queue hierarchy.

1. A flow queue (FQ): A single subscriber priority queue is referred to as a flow queue.

2. A subscriber queue (SQ): A combination of all priority queues of one subscriber is referred to as a subscriber queue.

3. A subscriber group priority queue (GQ): A queue constituted by combining some flow queues (for example, flow queues belonging to a same company) belonging to one (or more) priority is referred to as a subscriber group priority queue.

4. A virtual interface queue (VI): A queue constituted by combining some subscriber group priority queues (for example, subscriber group priority queues belonging to a same operator) belonging to one (or more) priority is referred to as a virtual interface queue.

5. A physical port queue (Dummy Port Queue (DP)): A queue constituted by combining virtual interface queues, belonging to one (or more) priority, of a same physical port is referred to as a physical port queue.

6. A logical port queue (Trunk Port Queue (TP)): A queue constituted by combining physical port queues, belonging to one (or more) priority, of a same logical port is referred to as a logical port queue.

402: The queue flushing processor modifies the flushing status of the target queue to "start flushing".

In this embodiment of the disclosure, when the queue flushing processor scans a flushing status of a queue that is "to be flushed", the queue flushing processor modifies the flushing status of the queue to "start flushing".

Step 401 and step 402 in this embodiment of the disclosure are mask scan performed by the queue flushing processor. The queue flushing processor may periodically perform step 401 and step 402 to perform mask scan.

403: The queue flushing processor flushes the target queue, where the flushing status of the target queue is modified to "flushing complete" after the target queue is flushed.

In this embodiment of the disclosure, the queue flushing processor flushes the target queue. A flushing result is that an element (for example, a PD) in the target queue is removed and reclaimed. The queue flushing processor may read a queue identifier of a queue in a queue linked list in a scheduler, and send a flushing check request for the target queue to a dequeueing processor. The dequeueing processor configures a flushing engine to remove the packet descriptor from the target queue. After all packet descriptors in the target queue are removed, the dequeueing processor reads and reclaims all the packet descriptors in the target queue from a packet descriptor cache, so that all the packet descriptors in the target queue can be allocated to a newly enqueued data packet for use. The engine in this embodiment of the disclosure may be classified into a dequeueing engine and a flushing engine. The dequeueing engine can perform parallel processing on multiple dequeueing requests in a multi-thread manner. The dequeueing engine can perform a dequeueing operation on a normally dequeued queue. The flushing engine can perform parallel processing on multiple flushing check requests in a multi-thread manner, and is configured to flush the target queue that needs to be flushed. In this embodiment of the disclosure, during flushing of the target queue, a priority of the target queue does not need to be considered. The dequeueing processor configures the flushing engine, and removes the packet descriptor from the target queue in parallel, so as to complete flushing of the target queue.

During implementation of the method shown in FIG. 4, during queue flushing, a queue priority does not need to be considered, all queues are scanned and flushed in a same manner, and multiple queues may be simultaneously scanned and flushed. This implements batch flushing of queues and can ensure a queue flushing completion time, thereby improving a queue batch flushing capability.

Figure 5:
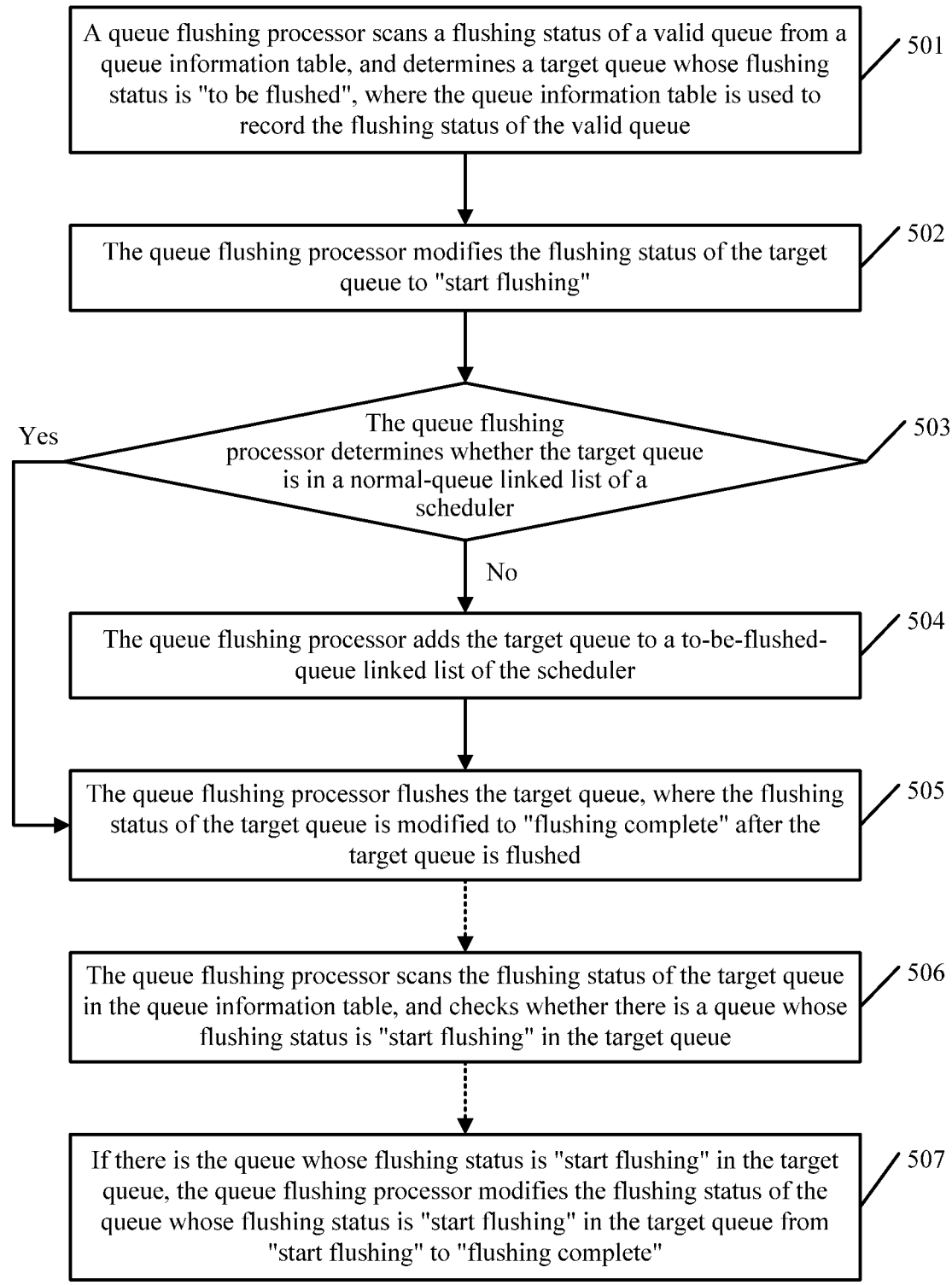
FIG. 5 is a schematic flowchart of another queue flushing method according to an embodiment of the disclosure.

Based on the schematic architecture diagrams shown in FIG. 1, FIG. 2, and FIG. 3, another queue flushing method is disclosed in FIG. 5. Referring to FIG. 5, FIG. 5 is a schematic flowchart of another queue flushing method according to an embodiment of the disclosure. As shown in FIG. 5, the queue flushing method includes the following steps.

501: A queue flushing processor scans a flushing status of a valid queue from a queue information table, and determines a target queue whose flushing status is "to be flushed", where the queue information table is used to record the flushing status of the valid queue.

502: The queue flushing processor modifies the flushing status of the target queue to "start flushing".

503: The queue flushing processor determines whether the target queue is in a normal-queue linked list of a scheduler, and performs step 504 if the target queue is not in the normal-queue linked list of the scheduler, or performs step 505 if the target queue is in the normal-queue linked list of the scheduler.

504: The queue flushing processor adds the target queue to a to-be-flushed-queue linked list of the scheduler, and performs step 505.

In this embodiment of the disclosure, the scheduler is configured to schedule a queue in the normal-queue linked list. The scheduler generally maintains a specific quantity of normal-queue linked lists. The normal-queue linked list is used to manage and schedule a queue of which a data packet can be directly sent by using a remaining credit. In addition to the normal-queue linked list, the to-be-flushed-queue linked list specially used for queue flushing may also be added in the scheduler. The to-be-flushed-queue linked list is used to string queues that are not in the normal-queue linked list and that need to be flushed. A queue linked list is also a type of queue. Each element in the queue linked list is a queue identifier. The queue linked list is also referred to as "a queue of queues".

If the target queue is in the normal-queue linked list of the scheduler, it indicates that the target queue can be normally scheduled by the scheduler. If the target queue is in the to-be-flushed-queue linked list of the scheduler, it indicates that the target queue can be flushed by a dequeueing processor.

505: The queue flushing processor flushes the target queue, where the flushing status of the target queue is modified to "flushing complete" after the target queue is flushed.

In this embodiment of the disclosure, the target queue needs to be flushed regardless of whether the target queue is in the normal-queue linked list of the scheduler or in the to-be-flushed-queue linked list of the scheduler, or a part of the target queue is in the normal-queue linked list of the scheduler and the other part of the target queue is in the to-be-flushed-queue linked list of the scheduler.

Optionally, in an implementation, step 505 may include the following steps.

(11) The queue flushing processor reads queue identifiers of all currently enqueued queues in the normal-queue linked list and/or the to-be-flushed-queue linked list.

(12) After the queue identifiers of all the currently enqueued queues in the normal-queue linked list and/or the to-be-flushed-queue linked list are all read by the queue flushing processor, the queue flushing processor receives a flushing complete indication sent by the dequeueing processor, where the flushing complete indication is used to indicate that all currently enqueued queues that need to be flushed in the normal-queue linked list and/or the to-be-flushed-queue linked list are flushed.

In this embodiment of the disclosure, step (11) and step (12) are a scheduler flushing scan procedure. If both the normal-queue linked list and the to-be-flushed-queue linked list include target queues, the queue flushing processor may simultaneously scan the normal-queue linked list and the to-be-flushed-queue linked list. For the normal-queue linked list, the queue flushing processor records, by using a scan pointer, a queue identifier that is currently being scanned in the normal-queue linked list, and records, by using a scan queue tail pointer, a queue identifier of a current queue tail of the normal-queue linked list (when a new queue is enqueued into the normal-queue linked list, the scan queue tail pointer remains unchanged). For the to-be-flushed-queue linked list, the queue flushing processor records, by using a scan pointer, a queue identifier that is currently being scanned in the to-be-flushed-queue linked list (for example, a queue identifier of a queue header), and records, by using a scan queue tail pointer, a queue identifier of a queue tail of the to-be-flushed-queue linked list (when a new queue is enqueued into the to-be-flushed-queue linked list, the scan queue tail pointer points to the newly enqueued queue).

It should be noted that, to reduce an impact of queue flushing on another operation such as normal dequeueing, enqueueing, or scheduling of a queue, in this embodiment of the disclosure, a priority of a flushing operation is lower than a priority of a normal scheduling operation by the scheduler. Therefore, when the queue flushing processor reads a queue identifier of a queue in the normal-queue linked list of the scheduler, the scheduler can still perform an operation, such as dequeueing or enqueueing, on the queue in the normal-queue linked list. When the queue flushing processor reads and sends a queue in the normal-queue linked list to the dequeueing processor for a flushing check, if the queue is normally scheduled, by the scheduler, to be dequeued (for a queue normally scheduled and dequeued, the dequeueing processor removes a PD from the queue by using a dequeueing engine, and reclaims the PD), the queue flushing processor continues to read and send a queue identifier of a next queue in the normal-queue linked list to the dequeueing processor for a flushing check. When the queue flushing processor reads and sends a queue in the normal-queue linked list to the dequeueing processor for a flushing check, if a flushing status of the queue is "start flushing" but the dequeueing processor currently has no available flushing engine, to ensure that the queue can be flushed, the queue flushing processor places the queue into the to-be-flushed-queue linked list (for example, into a queue tail of the to-be-flushed-queue linked list), and waits for the queue flushing processor to subsequently read and send the queue in the to-be-flushed-queue linked list to the dequeueing processor for a flushing operation. When the queue flushing processor is reading a queue identifier of a queue in the normal-queue linked list, if a new queue is enqueued into the normal-queue linked list, to control a read time of the normal-queue linked list, in this embodiment of the disclosure, a queue identifier of a current queue tail of the normal-queue linked list is recorded when the queue identifier of the queue in the normal-queue linked list just starts to be read, and a read operation on the normal-queue linked list terminates when the queue flushing processor reads the queue identifier of the queue tail. After starting scheduler flushing scan, the queue flushing processor records the queue identifier of the queue tail in the normal-queue linked list by using the scan queue tail pointer. When a queue identifier scanned by the scan pointer is the queue identifier of the queue tail, it indicates that scan of the normal-queue linked list is complete. Implementation of this embodiment of the disclosure can avoid a failure in terminating scan of the normal-queue linked list because of continual scan of newly enqueued queues when new queues continually enter the normal-queue linked list after the queue flushing processor starts scheduler flushing scan. By means of implementation of step (11) and step (12), after scheduler flushing scan is started, a queue that subsequently enters the normal-queue linked list is not scanned. This can ensure a completion time of scheduler flushing scan.

The queue flushing processor requires specific duration for reading the queue identifiers of all the currently enqueued queues in the normal-queue linked list and/or the to-be-flushed-queue linked list. The duration taken to read the queue identifiers of all the currently enqueued queues in the normal-queue linked list and/or the to-be-flushed-queue linked list is referred to as a second time interval. The second time interval may be set according to a quantity of queues that need to be scanned in the normal-queue linked list and/or the to-be-flushed-queue linked list in the scheduler and a processing capability of the queue flushing processor. For example, the second time interval is denoted by $T\_scheduler\_scan$, the quantity of queues that need to be scanned is denoted by $Total\_fq\_number$, and duration for scanning one queue is set to $T\_scheduler\_scan\_interval$. In this case, the second time interval $T\_scheduler\_scan = Total\_fq\_number \times T\_scheduler\_scan\_interval + T\_pd\_flush$.

T_pd_flush is a time required by the dequeueing processor to remove, from a packet descriptor cache, all packet descriptors in a queue that needs to be flushed. If a quantity of configured flushing engines is Flush_engine_number, a total quantity of engines is Total_engine_number, and it is assumed that a chip can read one packet descriptor per clock beat from the packet descriptor cache, a time required for removing one packet descriptor is Total_engine_number/Flush_engine_number clock beats. A total quantity of PDs that need to be removed is denoted by Total_pd_number. Then, T_pd_flush=Total_pd_number×Total_engine_number/Flush_engine_number clock beats.

A magnitude of T_scheduler_scan_interval may be set according to a processing capability of a chip (for example, a traffic management chip). For example, the processing capability of the chip is, for example, one queue can be scanned per clock beat. In this case. T_scheduler_scan_interval=64 clock beats may be set, to limit a scan-occupied chip processing capability to 1/64 of the processing capability of the chip. Setting T_scheduler_scan_interval to 64 clock beats can prevent the scheduler scan-occupied processing capability from affecting other normal processing (for example, queue dequeueing, enqueueing, scheduling, and the like) performed by the chip. For example, it is assumed that a chip frequency is 500 MHz. and the quantity of queues that need to be scanned Total_fq_number is 512 K, where K represents 1024. In this case, a time of each clock beat is 1/500 MHz=2 ns. The quantity of configured flushing engines is Flush_engine_number=1, the total quantity of engines is Total_engine_number=64, and Total_pd_numbe=1 M, where M represents 1024×1024. The second time interval T_scheduler_scan=Total_fq_number×T_scheduler_scan_interval+T_pd_flush, where T_pd_flush=Total_pd_number×(Total_engine_number/Flush_engine_number)×Time of each clock beat. Therefore, T_scheduler_scan=512×1024×64×2 ns+1×1024×1024×64×2 ns=67.1 ms+134.2 ms=201.3 ms.

The queue flushing processor scans the normal-queue linked list, and when a queue identifier in the normal-queue linked list is scanned, sends a flushing check request for the queue identifier to the dequeueing processor. After receiving the flushing check request, the dequeueing processor reads a flushing status of a queue corresponding to the queue identifier in the queue information table. If the queue identifier is valid (that is, the queue identifier is not scheduled by the scheduler) and the flushing status of the queue is "start flushing", the dequeueing processor sends a flushing check result to the queue flushing processor, and removes a packet descriptor from the queue by using the configured flushing engine. After receiving the flushing check result sent by the dequeueing processor, the queue flushing processor dequeues the target queue identifier from the normal-queue linked list and/or the to-be-flushed-queue linked list.

Optionally, in an implementation, scanning the scheduler by the queue flushing processor and flushing the queue by the dequeueing processor may include the following steps.

(21) The queue flushing processor reads a first queue identifier of a first queue in the normal-queue linked list and/or the to-be-flushed-queue linked list, and sends a flushing check request for the first queue identifier to the dequeueing processor, where the flushing check request is used to request the dequeueing processor to check a flushing status of the first queue, and the first queue is any one of all the currently enqueued queues in the normal-queue linked list and/or the to-be-flushed-queue linked list.

(22) The dequeueing processor receives the flushing check request that is sent by the queue flushing processor and that is for the first queue identifier, and reads, from the queue information table, the flushing status of the first queue corresponding to the first queue identifier.

(23) When the flushing status of the first queue is "start flushing", the dequeueing processor sends a flushing check result to the queue flushing processor, removes a packet descriptor from the first queue by using the configured flushing engine, and reclaims the packet descriptor, where the flushing check result is used to indicate whether the first queue needs to be flushed.

(24) The queue flushing processor receives the flushing check result sent by the dequeueing processor, and if the flushing check result indicates that the first queue needs to be flushed and the dequeueing processor has an available flushing engine for flushing the first queue, the queue flushing processor dequeues the first queue from the normal-queue linked list and/or the to-be-flushed-queue linked list, and reads a queue identifier of a next queue of the first queue in the normal-queue linked list and/or the to-be-flushed-queue linked list.

(25) If the flushing check result indicates that the first queue needs to be flushed and the dequeueing processor has no available flushing engine for flushing the first queue, the queue flushing processor adds the first queue to the to-be-flushed-queue linked list, and reads a queue identifier of a next queue of the first queue in the normal-queue linked list and/or the to-be-flushed-queue linked list.

(26) If the flushing check result indicates that the first queue does not need to be flushed, the queue flushing processor reads a queue identifier of a next queue of the first queue in the normal-queue linked list and/or the to-be-flushed-queue linked list.

In this embodiment of the disclosure, when the flushing status, of the first queue corresponding to the first queue identifier, read by the dequeueing processor from the queue information table is "start flushing", the dequeueing processor removes the PD from the first queue by using the configured flushing engine, and reclaims the PD. Because the quantity of configured flushing engines for flushing accounts for a relatively small percentage of the total quantity of engines, the dequeueing processor is likely to have no available flushing engine currently for flushing the first queue. To ensure that the first queue can be flushed in this case, the queue flushing processor places the first queue into the to-be-flushed-queue linked list (for example, into the queue tail of the to-be-flushed-queue linked list), and waits for the queue flushing processor to subsequently read and send the first queue in the to-be-flushed-queue linked list to the dequeueing processor for a flushing operation.

Optionally, a manner in which the dequeueing processor removes the packet descriptor from the first queue by using the configured flushing engine and reclaims the packet descriptor includes removing, by the dequeueing processor, the PD from the first queue by using the configured flushing engine, and reclaiming the PD from the packet descriptor cache.

In this embodiment of the disclosure, an engine may be classified into a dequeueing engine and a flushing engine. The dequeueing engine can perform parallel processing on multiple dequeueing requests in a multi-thread manner. The dequeueing engine can perform a dequeueing operation on a normally dequeued queue. The flushing engine can perform parallel processing on multiple flushing check requests in a multi-thread manner, and is used for a purpose of reclaiming, from the packet descriptor cache, a PD in a target queue that needs to be flushed (the reclaimed PD may be used for another purpose, for example, the reclaimed PD may be allocated to a newly enqueued data packet). The flushing engine is for reclaiming the PD for reuse instead of completely deleting and discarding the PD.

A main function of the dequeueing processor is to process queue dequeueing. The dequeueing processor generally performs parallel processing on dequeueing requests by using multiple dequeueing engines. In this embodiment of the disclosure, during queue flushing, an engine also needs to process queue flushing. Therefore, a specific quantity of engines among dequeueing engines are configured as flushing engines. To control an impact of queue flushing on normal queue dequeueing, a quantity of the flushing engines (engines used for queue flushing) may be limited to be not greater than a preset threshold. For example, if there are a total of 100 engines, the quantity of the flushing engines may be limited to be not greater than 5, so as to ensure that at least 95 engines are configured to process normal queue dequeueing. After receiving the flushing check request, when at least one flushing engine is idle, the dequeueing processor configures the flushing engine for processing a flushing check.

Optionally, after the dequeueing processor removes the PD from the first queue by using the configured flushing engine, and reclaims the PD from the packet descriptor cache, the dequeueing processor may further perform the following steps.

(31) The dequeueing processor modifies the flushing status of the first queue to "flushing complete".

(32) After all queues that need to be flushed are flushed, the dequeueing processor sends a flushing complete indication to the queue flushing processor, where the flushing complete indication is used to indicate to the queue flushing processor that a flushing operation on all the queues that need to be flushed is completed.

In this embodiment of the disclosure, after the dequeueing processor removes the PD from the first queue by using the configured flushing engine, and reclaims the PD from the packet descriptor cache, the dequeueing processor modifies the flushing status of the first queue to "flushing complete". After the dequeueing processor processes all queue flushing requests sent by the queue flushing processor and modifies flushing statuses of all the queues that need to be flushed to "flushing complete", the dequeueing processor sends the flushing complete indication to the queue flushing processor, where the flushing complete indication is used to indicate to the queue flushing processor that the flushing operation on all the queues that need to be flushed is completed. At this moment, scheduler flushing scan by the queue flushing processor formally terminates.

Optionally, after step 505 is performed, step 506 and step 507 may further be performed.

506: The queue flushing processor scans the flushing status of the target queue in the queue information table, and checks whether there is a queue whose flushing status is "start flushing" in the target queue.

507: If there is the queue whose flushing status is "start flushing" in the target queue, the queue flushing processor modifies the flushing status of the queue whose flushing status is "start flushing" in the target queue from "start flushing" to "flushing complete".

In this embodiment of the disclosure, the queue flushing operation already terminates after steps 501 to 505 are performed. However, queue flushing status modification is likely to be omitted during scheduler flushing scan. In this case, step 506 and step 507 need to be performed after step 505, so as to ensure that the queue that needs to be flushed is completely flushed. For a scheduler that performs scheduling based on a credit, the scheduler preallocates a specific credit to a queue when performing normal scheduling on the queue, so that the queue can send a data packet corresponding to the credit. For example, a queue can send a data packet of 1 K only when the scheduler allocates a credit of 1 K to the queue. If a queue in the normal-queue linked list of the scheduler has been flushed by the dequeueing processor before being scheduled by the scheduler, because the queue is flushed, a data packet in the queue is not normally scheduled and sent, and a credit of the queue is actually not used. To ensure that the credit allocated by the scheduler is not wasted (that is, to ensure that a bandwidth allocated by the scheduler is not reduced due to a flushing operation), the previously allocated credit needs to be returned to the scheduler after the queue is flushed. Generally, after flushing a queue, the dequeueing processor returns, to the scheduler, a credit that is previously allocated to the queue. The dequeueing processor modifies a flushing status of the queue from "start flushing" to "flushing complete" only after the credit is returned to the scheduler. Credit returning is likely to fail if the scheduler is allocating a credit to another queue when the dequeueing processor returns the previously allocated credit to the scheduler. When credit returning fails, the flushing status of the queue is still "start flushing" instead of being modified to "flushing complete". Therefore, in this embodiment of the disclosure, step 506 and step 507 are added, to ensure that the queue that needs to be flushed is completely flushed.

The following explains why credit returning fails. The scheduler may store a credit by using a NVRAM. If the NVRAM is a one-port random access memory (RAM), the NVRAM can perform only one read operation or one write operation in one clock beat. That is, in one clock beat, the scheduler can merely allocate a credit to a queue or receive a credit returned by a queue. When the queue flushing processor performs scheduler flushing scan, a priority of a flushing operation is lower than a priority of a normal scheduling operation performed by the scheduler. Therefore, in one clock beat, if the scheduler is allocating a credit to a queue while a credit of a queue is being returned, credit returning fails. If the NVRAM is a two-port RAM, credit returning does not fail.

Step 506 and step 507 are also referred to as cleanup scan). Duration required for cleanup scan is referred to as a third time interval. The third preset time interval may be set according to a quantity of valid queues and a processing capability of the queue flushing processor. For example, the quantity of valid queues is Total_fq_number, and duration for scanning one queue is set to T_cleanup_scan_interval. In this case, the third time interval T_cleanup_scan=Total_fq_number×T_cleanup_scan_interval. A magnitude of T_cleanup_scan_interval may be set according to a processing capability of a chip (for example, a traffic management chip). For example, the processing capability of the chip is, for example, one queue can be scanned per clock beat. In this case. T_cleanup_scan_interval=64 clock beats may be set, to limit a scan-occupied chip processing capability to 1/64 of the processing capability of the chip. Setting T_cleanup_scan_interval to 64 clock beats can prevent the scan-occupied processing capability from affecting other normal processing (for example, queue dequeueing, enqueueing, scheduling, and the like) performed by the chip. For example, it is assumed that a chip frequency is 500 MHz. and the quantity of valid queues Total_fq_number is 512 K. In this case, a time of each clock beat is 1/500 MHz=2 ns, and the third time interval T_cleanup_scan=Total_fq_number×T_cleanup_scan_interval=512×1024×64×2 ns=67.1 ms.

The following describes a scheduler flushing scan process from a perspective of a queue flushing processor. In a scenario, it is assumed that there are 10 normal-queue linked lists and one to-be-flushed-queue linked list in the scheduler, and the queue flushing processor scans a preset normal-queue linked list in the 10 normal-queue linked lists (for example, five preset normal-queue linked lists in the 10 normal-queue linked lists). When the queue flushing processor starts to perform scheduler flushing scan on the five normal-queue linked lists (including a first normal-queue linked list, a second normal-queue linked list, a third normal-queue linked list, a fourth normal-queue linked list, and a fifth normal-queue linked list), the queue flushing processor may scan the five normal-queue linked lists one by one. For example, when scanning the first normal-queue linked list, first, the queue flushing processor records, by using a scan pointer, a queue identifier that is currently being scanned in the first normal-queue linked list, and records, by using a scan queue tail pointer, a queue identifier of a queue tail of the first normal-queue linked list. Then, the queue flushing processor starts to perform scheduler flushing scan on the first normal-queue linked list, reads a scanned queue identifier (for example, FQID1) in the first normal-queue linked list one by one, determines whether the to-be-flushed-queue linked list is empty, and if not empty, reads a queue identifier (FQID2) of a queue header of the to-be-flushed-queue linked list, or if empty, does not perform any processing on the to-be-flushed-queue linked list. Then, for example, if the to-be-flushed-queue linked list is not empty, the queue flushing processor sends the FQID1 and the FQID2 to the dequeueing processor for a flushing check, and waits for a flushing check result obtained by the dequeueing processor. When the queue flushing processor waits for the flushing check result, if the FQID1 is normally scheduled, by the scheduler, to be dequeued, the scan pointer is pointed to a next queue identifier in the first normal-queue linked list. If the flushing check result indicates that a flushing status of a queue corresponding to the FQID2 is "start flushing", the queue corresponding to the FQID2 is dequeued from the to-be-flushed-queue linked list. If the scan pointer remains unchanged when the queue flushing processor waits for the flushing check result, and the flushing check result indicates that a flushing status of a queue corresponding to the FQID1 is "start flushing", the queue corresponding to the FQID1 is removed from the first normal-queue linked list, and the scan pointer is pointed to a next queue identifier in the first normal-queue linked list. After a flushing check is completed for the queue identifier to which the scan queue tail pointer points or the queue identifier to which the scan queue tail pointer points is normally dequeued, flushing scan of the first normal-queue linked list is complete, and a next normal-queue linked list (for example, the second normal-queue linked list) continues to be scanned.

The following describes the scheduler flushing scan process from a perspective of a dequeueing processor. In a scenario, after the dequeueing processor receives a flushing check request that is sent by the queue flushing processor and that is for an FQID1 and an FQID2, the dequeueing processor reads, from the queue information table, a flushing status of a target queue corresponding to the FQID1. When the read flushing status of the target queue corresponding to the FQID1 is "start flushing", the dequeueing processor sends a flushing check result to the queue flushing processor. The flushing check result is used to indicate that the flushing status of the FQID1 is "start flushing". After sending the flushing check result to the queue flushing processor, the dequeueing processor removes a packet descriptor from the target queue by using the configured flushing engine. If there is one configured flushing engine, the dequeueing processor can flush only one target queue at a time. For example, when the read flushing status of the target queue corresponding to the FQID1 is "start flushing", the flushing engine first performs flushing processing on the target queue corresponding to the FQID1. After the PD is removed from the target queue corresponding to the FQID1, the flushing engine performs flushing processing on a target queue corresponding to the FQID2. In another scenario, the dequeueing processor also performs a flushing check on a queue 1 that is normally scheduled and dequeued. When a read flushing status of the queue 1 is "start flushing", it indicates that the queue 1 is a queue that needs to be flushed. In this case, the dequeueing processor determines whether there is an idle-state flushing engine. If there is an idle-state flushing engine, the dequeueing processor removes a packet descriptor from the queue 1 by using the idle-state flushing engine. If there is no idle-state flushing engine, the dequeueing processor places the queue 1 into the to-be-flushed-queue linked list, so that the queue 1 waits to be flushed.

It should be noted that flushing a target queue means reclaiming a PD in the target queue from the packet descriptor cache. A data packet originally corresponding to the PD does not need to be removed. The data packet becomes a data packet without any packet descriptor. Whether the data packet is removed does not affect flushing of the target queue.

For implementations of step 501 and step 502 in FIG. 5, refer to step 401 and step 402 shown in FIG. 4. For implementations of step 506 and step 507, refer to step 404 and step 405 shown in FIG. 4. Details are not described herein again.

Optionally, the following steps may further be performed before step 501, or after step 507, or between step 501 and step 507.

(41) The queue flushing processor receives a flushing command for at least one queue, and records, in the queue information table, a flushing status of the at least one queue as "to be flushed".

(42) The queue flushing processor discards a data packet when the data packet is enqueued into the at least one queue.

(43) The queue flushing processor discards a data packet scheduling instruction when receiving the data packet scheduling instruction for the at least one queue.

In this embodiment of the disclosure, the queue flushing processor may receive the flushing command that is sent by a central processing unit and that is for at least one queue, and record, in the queue information table, the flushing status of the at least one queue as "to be flushed". When a flushing status of a queue is "to be flushed" or "start flushing", if a data packet is to be scheduled to enter the queue, the queue flushing processor discards the data packet. When receiving a data packet scheduling instruction for a queue whose flushing status is "to be flushed" or "start flushing" (for example, a data packet is to be scheduled out of the queue), the queue flushing processor discards the data packet scheduling instruction. After a queue enters a flushing procedure, an enqueueing operation cannot be performed on the queue, and a new data packet scheduling instruction for the queue cannot be received either. This can ensure that, during a flushing process, the queue can be unaffected by a new scheduling operation.

The following uses an example to describe a time required for queue flushing.

For example, it is assumed that a chip frequency is 500 MHz. and the quantity of valid queues Total_fq_number is 512 K. In this case, a time of each clock beat is 1/500 MHz=2 ns. The quantity of configured flushing engines is Flush_engine_number=1, the total quantity of engines is Total_engine_number=64, and Total_pd_number=1 M. The first time interval T_mask_scan=Total_fq_number×T_mask_scan_interval=512×1024×64×2 ns=67.1 ms. The second time interval T_cleanup_scan=Total_fq_number×T_cleanup_scan_interval=512×1024×64×2 ns=67.1 ms. The third time interval T_scheduler_scan=Total_fq_number×T_scheduler_scan_interval+T_pd_flush, where T_pd_flush=Total_pd_number×(Total_engine_number/Flush_engine_number)×Time of each clock beat. Therefore, T_scheduler_scan=512×1024×64×2 ns+1×1024×1024×64×2 ns=67.1 ms+134.2 ms=201.3 ms. Therefore, an upper time limit for completing one round of queue flushing scan is T_flush_round=T_mask_scan+T_cleanup_scan+T_scheduler_scan=67.1 ms+67.1 ms+201.3 ms=335.5 ms. Generally, after software issues a flushing command, one round of queue flushing scan starts, and a queue that needs to be flushed can be flushed within the upper time limit for one round of queue flushing scan. After the software issues a flushing command, if one round of queue flushing scan has started, a queue that needs to be flushed waits until this round of queue flushing scan is complete, and then can be flushed after a next round of queue flushing scan. It can be learned that a queue can be flushed within a duration of two rounds of queue flushing scan after the software issues a flushing command. Therefore, an upper time limit for queue flushing T_flush=2×T_flush_round=671 ms.

During implementation of the method shown in FIG. 5, queue flushing can be completed after three times of scan (mask scan, scheduler flushing scan, and cleanup scan). A queue priority does not need to be considered, and multiple queues may be simultaneously scanned and flushed. This ensures a queue flushing completion time, thereby improving a queue flushing capability.

Figure 6:
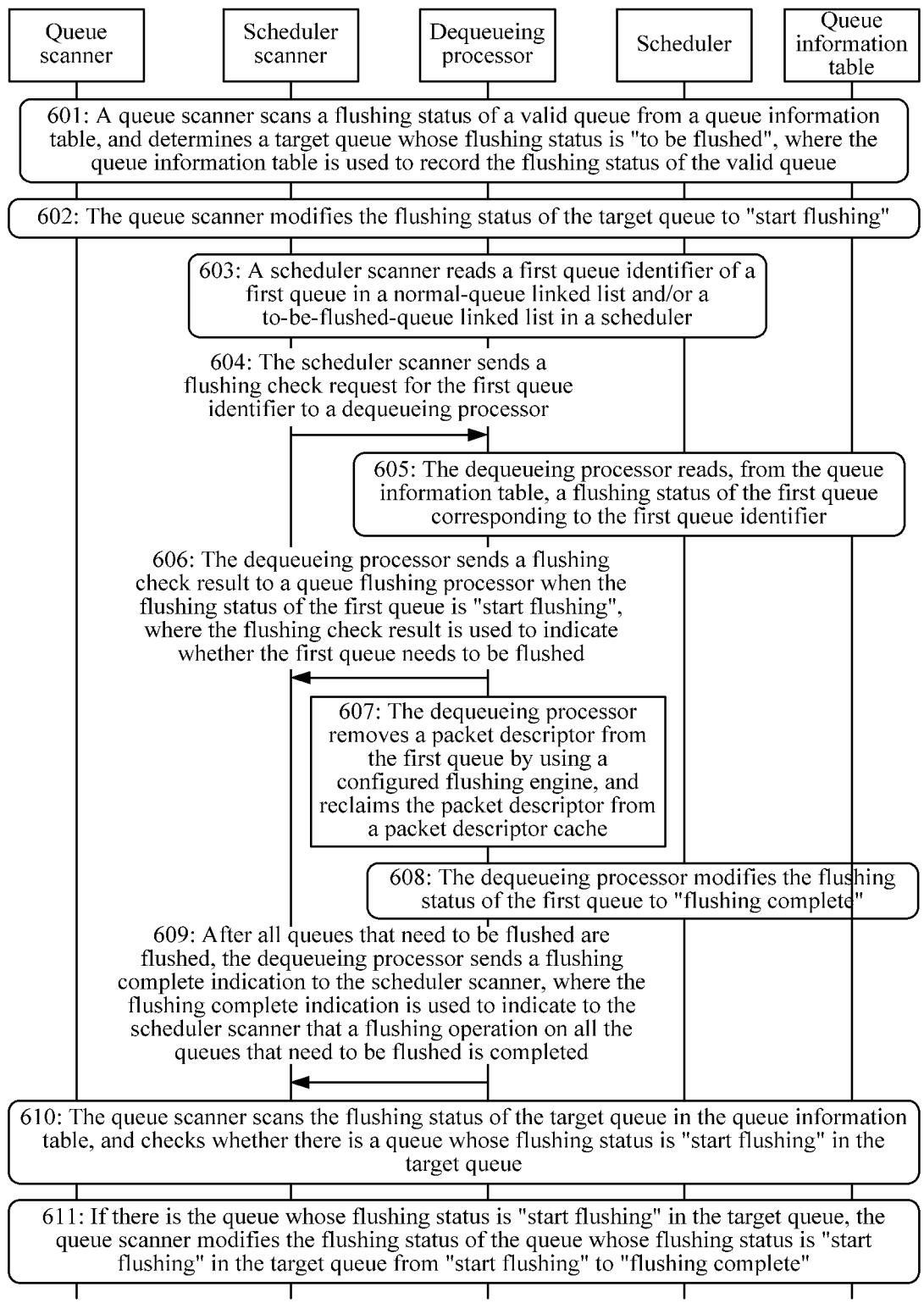
FIG. 6 is a schematic flowchart of another queue flushing method according to an embodiment of the disclosure.

Based on the schematic architecture diagrams shown in FIG. 1, FIG. 2, and FIG. 3, another queue flushing method is disclosed. Referring to FIG. 6, FIG. 6 is a schematic flowchart of another queue flushing method according to an embodiment of the disclosure. As shown in FIG. 6, the queue flushing method includes the following steps.

601: A queue scanner scans a flushing status of a valid queue from a queue information table, and determines a target queue whose flushing status is "to be flushed", where the queue information table is used to record the flushing status of the valid queue.

602: The queue scanner modifies the flushing status of the target queue to "start flushing".

Step 601 and step 602 are a mask scan process performed by the queue scanner.

603: A scheduler scanner reads a first queue identifier of a first queue in a normal-queue linked list and/or a to-be-flushed-queue linked list in a scheduler.

604: The scheduler scanner sends a flushing check request for the first queue identifier to a dequeueing processor.

The flushing check request is used to request the dequeueing processor to check a flushing status of the first queue, and the first queue is any one of all currently enqueued queues in the normal-queue linked list and/or the to-be-flushed-queue linked list.

605: The dequeueing processor reads, from the queue information table, the flushing status of the first queue corresponding to the first queue identifier.

606: The dequeueing processor sends a flushing check result to a queue flushing processor when the flushing status of the first queue is "start flushing", where the flushing check result is used to indicate whether the first queue needs to be flushed.

607: The dequeueing processor removes a packet descriptor from the first queue by using a configured flushing engine, and reclaims the PD from a packet descriptor cache.

608: The dequeueing processor modifies the flushing status of the first queue to "flushing complete".

609: After all queues that need to be flushed are flushed, the dequeueing processor sends a flushing complete indication to the scheduler scanner, where the flushing complete indication is used to indicate to the scheduler scanner that a flushing operation on all the queues that need to be flushed is completed.

Step 603 to step 609 are a scheduler flushing scan process performed by the scheduler scanner and the dequeueing processor.

610: The queue scanner scans the flushing status of the target queue in the queue information table, and checks whether there is a queue whose flushing status is "start flushing" in the target queue.

611: If there is the queue whose flushing status is "start flushing" in the target queue, the queue scanner modifies the flushing status of the queue whose flushing status is "start flushing" in the target queue from "start flushing" to "flushing complete".

Step 610 and step 611 are a cleanup scan process performed by the queue scanner.

During implementation of the method shown in FIG. 6, queue flushing can be completed after three times of scan (mask scan, scheduler flushing scan, and cleanup scan). A queue priority does not need to be considered, and multiple queues may be simultaneously scanned and flushed. This ensures a queue flushing completion time, thereby improving a queue flushing capability.

Figure 7:
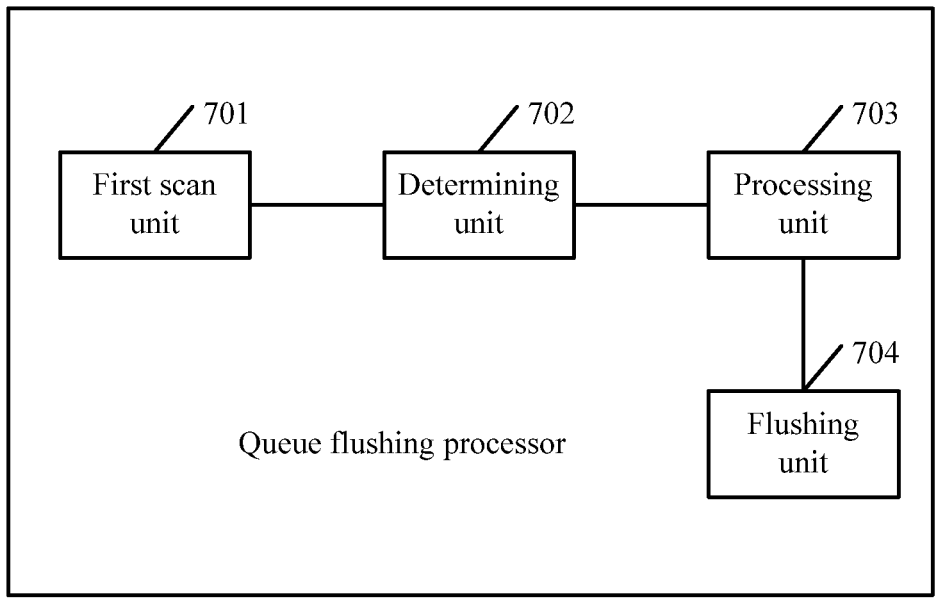
FIG. 7 is a schematic structural diagram of a queue flushing processor according to an embodiment of the disclosure.

Referring to FIG. 7. FIG. 7 is a schematic structural diagram of a queue flushing processor according to an embodiment of the disclosure. As shown in FIG. 7, the queue flushing processor includes a first scan unit 701, a determining unit 702, a processing unit 703, and a flushing unit 704.

The first scan unit 701 is configured to scan a flushing status of a valid queue from a queue information table.

The determining unit 702 is configured to determine a target queue whose flushing status is "to be flushed". The queue information table is used to record the flushing status of the valid queue.

The processing unit 703 is configured to modify the flushing status of the target queue to "start flushing".

The flushing unit 704 is configured to flush the target queue. The flushing status of the target queue is modified to "flushing complete" after the target queue is flushed.

In this embodiment of the disclosure, a priority of the target queue does not need to be considered, and multiple queues may be simultaneously scanned and flushed. This implements batch flushing of queues and can ensure a queue flushing completion time, thereby improving a queue batch flushing capability.

For implementation of the queue flushing processor, refer to the method embodiment shown in FIG. 4. Repetition is omitted herein.

Figure 8:
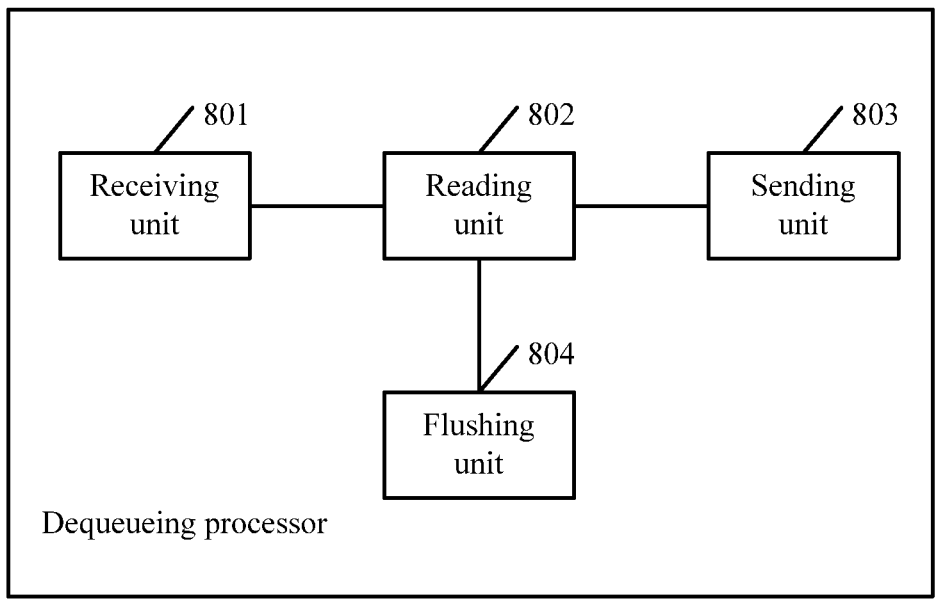
FIG. 8 is a schematic structural diagram of a dequeueing processor according to an embodiment of the disclosure.

Referring to FIG. 8, FIG. 8 is a schematic structural diagram of a dequeueing processor according to an embodiment of the disclosure. As shown in FIG. 8, the dequeueing processor includes a receiving unit 801, a reading unit 802, a sending unit 803, and a flushing unit 804.

The receiving unit 801 is configured to receive a flushing check request that is sent by a queue flushing processor and that is for a first queue identifier.

The reading unit 802 is configured to read, from a queue information table, a flushing status of a first queue corresponding to the first queue identifier.

The sending unit 803 is configured to send a flushing check result to the queue flushing processor when the flushing status of the first queue is "start flushing", where the flushing check result is used to indicate whether the first queue needs to be flushed.

The flushing unit 804 is configured to, when the flushing status of the first queue is "start flushing", remove a packet descriptor from the first queue by using a configured flushing engine, and reclaim the packet descriptor.

When performing queue flushing, the dequeueing processor in this embodiment of the disclosure does not need to consider a queue priority, and performs queue flushing by using the configured flushing engine. This can ensure a queue flushing completion time, thereby improving a queue flushing capability.

For implementation of the dequeueing processor, refer to the method embodiment shown in FIG. 5. Repetition is omitted herein.

Sequence adjustment, merging, and deletion may be performed on steps of the method in the embodiments of the disclosure according to an actual requirement.

Merging, division, and deletion may be performed on units or subunits of a terminal or device in the embodiments of the disclosure according to an actual requirement.

A person of ordinary skill in the art may understand that all or a part of the steps of the methods in the foregoing embodiments may be implemented by a program instructing relevant hardware. For example, the program may be stored in a computer readable storage medium, and is invoked by a processor for implementation. The storage medium includes a read-only memory (ROM), a RAM, a programmable ROM (PROM), an erasable programmable read only memory (EPROM), a one-time programmable read-only memory (OTPROM), an electrically erasable programmable read only memory (EEPROM), a compact disc read-only memory (CD-ROM) or another optical disc memory, a magnetic disk memory, a magnetic tape memory, or any other computer readable medium that can be configured to carry or store data.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A queue flushing method implemented by a queue flushing processor, comprising:
    scanning a flushing status of a valid queue from a queue information table to determine a target queue whose flushing status is a first status of to be flushed, wherein the queue information table records the flushing status of the valid queue, and wherein the flushing status of the valid queue represents a status of an operation on an element in the valid queue;
    modifying the flushing status of the target queue to a second status of start flushing after determining the target queue whose flushing status is the first status of to be flushed;
    flushing the target queue, wherein the flushing status of the target queue is modified to a third status of flushing complete after the target queue is flushed;
    scanning the flushing status of the target queue in the queue information table;
    checking whether there is a queue whose flushing status is the second status of start flushing in the target queue; and
    modifying the queue whose flushing status is the second status of start flushing in the target queue to the third status of flushing complete when the queue information table comprises the queue whose flushing status is the second status of start flushing in the target queue.

2. The queue flushing method of claim 1, wherein after modifying the flushing status of the target queue to the second status of start flushing, the queue flushing method further comprises:
    determining whether the target queue is in a normal-queue linked list of a scheduler that indicates whether to schedule the target queue; and
    adding the target queue to a to-be-flushed-queue linked list of the scheduler and performing flushing of the target queue when the target queue is not in the normal-queue linked list of the scheduler.

3. The queue flushing method of claim 2, wherein performing flushing of the target queue comprises:
    reading queue identifiers of all currently enqueued queues in one or more of the normal-queue linked list and the to-be-flushed-queue linked list; and
    receiving a flushing complete indication from a dequeueing processor after reading the queue identifiers of all the currently enqueued queues in one or more of the normal-queue linked list and the to-be-flushed-queue linked list, wherein the flushing complete indication indicates that all of the currently enqueued queues that need to be flushed in one or more of the normal-queue linked list and the to-be-flushed-queue linked list are flushed.

4. The queue flushing method of claim 3, wherein reading the queue identifiers of all currently enqueued queues comprises:
    reading a first queue identifier of a first queue in one or more of the normal-queue linked list and the to-be-flushed-queue linked list;
    sending a flushing check request for the first queue identifier to the dequeueing processor after reading the first queue identifier of the first queue in one or more of the normal-queue linked list and the to-be-flushed-queue linked list, wherein the flushing check request requests the dequeueing processor to check a flushing status of the first queue, and wherein the first queue is any of the currently enqueued queues in one or more of the normal-queue linked list and the to-be-flushed-queue linked list;
    receiving a flushing check result from the dequeueing processor, wherein the flushing check result indicates whether the first queue is to be flushed; and
    dequeueing the first queue from one or more of the normal-queue linked list and the to-be-flushed-queue linked list and reading a queue identifier of a next queue of the first queue in one or more of the normal-queue linked list and the to-be-flushed-queue linked list when the flushing check result indicates that the first queue is to be flushed and the dequeueing processor has an available flushing engine for flushing the first queue;

adding the first queue to the to-be-flushed-queue linked list when the flushing check result indicates that the first queue is to be flushed and the dequeueing processor has no available flushing engine for flushing the first queue;

reading a queue identifier of a next queue of the first queue in one or more of the normal-queue linked list and the to-be-flushed-queue linked list when the flushing check result indicates that the first queue is to be flushed and the dequeueing processor has no available flushing engine for flushing the first queue; and reading a queue identifier of a next queue of the first queue in one or more of the normal-queue linked list and the to-be-flushed-queue linked list when the flushing check result indicates that the first queue is not to be flushed.

5. The queue flushing method of claim 1, further comprising:

receiving a flushing command for at least one queue; and recording in the queue information table, a flushing status of at least one of the queues as the first status of to be flushed.

6. The queue flushing method of claim 5, wherein after recording, in the queue information table, a flushing status of at least one of the queues as the first status of to be flushed, the queue flushing method further comprises:

discarding a data packet when the data packet is enqueued into at least one of the queues; and discarding a data packet scheduling instruction when receiving a data packet scheduling instruction for at least one of the queues.

7. The queue flushing method of claim 1, wherein after modifying the flushing status of the target queue to the second status of start flushing, the queue flushing method further comprises:

determining whether the target queue is in a normal-queue linked list of a scheduler that indicates whether to schedule the target queue; and adding the target queue to a to-be-flushed-queue linked list of the scheduler and performing flushing of the target queue when the target queue is in the normal-queue linked list of the scheduler.

8. A queue flushing processor, comprising:

a memory comprising executable instructions; and a processor coupled to the memory and configured to execute the instructions that cause the processor to be configured to:

scan a flushing status of a valid queue from a queue information table;

determine a target queue whose flushing status is a first status of to be flushed, wherein the queue information table records the flushing status of the valid queue;

modify the flushing status of the target queue to a second status of start flushing after determining the target queue whose flushing status is the first status of to be flushed;

flush the target queue, wherein the flushing status of the target queue is modified to a third status of flushing complete after the target queue is flushed;

scan the flushing status of the target queue in the queue information table;

check whether there is a queue whose flushing status is the status of start flushing in the target queue; and modify the queue whose flushing status is the second status of start flushing in the target queue to the third status of flushing complete when the queue information table comprises the queue whose flushing status is the second status of start flushing in the target queue.

9. The queue flushing processor of claim 8, wherein the instructions further cause the processor to be configured to:

determine whether the target queue is in a normal-queue linked list of a scheduler, wherein the scheduler is configured to schedule a queue in the normal-queue linked list;

add the target queue to a to-be-flushed-queue linked list of the scheduler when determining that the target queue is not in the normal-queue linked list of the scheduler; and flush the target queue after adding the target queue to the to-be-flushed-queue linked list of the scheduler.

10. The queue flushing processor of claim 9, wherein the instructions further cause the processor to be configured to read queue identifiers of all currently enqueued queues in one or more of the normal-queue linked list and the to-be-flushed-queue linked list, wherein the queue flushing processor further comprises a receiver configured to receive, after reading the queue identifiers of all the currently enqueued queues in one or more of the normal-queue linked list and the to-be-flushed-queue linked list, a flushing complete indication from a dequeueing processor, and wherein the flushing complete indication indicates that all of the currently enqueued queues that need to be flushed in one or more of the normal-queue linked list and the to-be-flushed-queue linked list are flushed.

11. The queue flushing processor of claim 10, wherein the instructions further cause the processor to be configured to:

read a first queue identifier of a first queue in one or more of the normal-queue linked list and the to-be-flushed-queue linked list;

send a flushing check request for the first queue identifier to the dequeueing processor after reading the first queue identifier of the first queue in one or more of the normal-queue linked list and the to-be-flushed-queue linked list, wherein the flushing check request instructs the dequeueing processor to check a flushing status of the first queue, and wherein the first queue is any of the currently enqueued queues in one or more of the normal-queue linked list and the to-be-flushed-queue linked list;

receive a flushing check result from the dequeueing processor, wherein the flushing check result indicates whether the first queue is to be flushed;

dequeue the first queue from one or more of the normal-queue linked list and the to-be-flushed-queue linked list, read, after dequeueing the first queue from one or more of the normal-queue linked list and the to-be-flushed-queue linked list, a queue identifier of a next queue of the first queue in one or more of the normal-queue linked list and the to-be-flushed-queue linked list when the flushing check result indicates that the first queue is to be flushed and the dequeueing processor has an available flushing engine for flushing the first queue;

add the first queue to the to-be-flushed-queue linked list when the flushing check result indicates that the first queue is to be flushed and the dequeueing processor has no available flushing engine for flushing the first queue;

read a queue identifier of a next queue of the first queue in one or more of the normal-queue linked list and the to-be-flushed-queue linked list when the flushing check result indicates that the first queue is to be flushed and the dequeueing processor has no available flushing engine for flushing the first queue; and read a queue identifier of a next queue of the first queue in one or more of the normal-queue linked list and the to-be-flushed-queue linked list when the flushing check result indicates that the first queue is not to be flushed.

12. The queue flushing processor of claim 8, wherein the instructions further cause the processor to be configured to:
receive a flushing command for at least one queue; and
record, in the queue information table, a flushing status of at least one of the queues as the first status of to be flushed.

13. The queue flushing processor according to claim 12, wherein the instructions further cause the processor to be configured to:
discard a data packet when the data packet is enqueued into at least one of the queues; and
discard a data packet scheduling instruction when receiving the data packet scheduling instruction for at least one of the queues.

14. The queue flushing processor of claim 8, wherein the instructions further cause the processor to be configured to:
determine whether the target queue is in a normal-queue linked list of a scheduler, wherein the scheduler is configured to schedule a queue in the normal-queue linked list;
add the target queue to a to-be-flushed-queue linked list of the scheduler when determining that the target queue is not in the normal-queue linked list of the scheduler; and
flush the target queue when determining that the target queue is in the normal-queue linked list of the scheduler.

15. A computer program product comprising computer-executable instructions stored on a non-transitory computer-readable medium that, when executed by a processor, cause a queue flushing processor to:
scan a flushing status of a valid queue from a queue information table;
determine a target queue whose flushing status is a first status of to be flushed, wherein the queue information table records the flushing status of the valid queue;
modify the flushing status of the target queue to a second status of start flushing after determining the target queue whose flushing status is the first status of to be flushed;
flush the target queue, wherein the flushing status of the target queue is modified to a third status of flushing complete after the target queue is flushed;
scan the flushing status of the target queue in the queue information table;
check whether there is a queue whose flushing status is the second status of start flushing in the target queue; and
modify the queue whose flushing status is the second status of start flushing in the target queue to the third status of flushing complete when the queue information table comprises the queue whose flushing status is the second status of start flushing in the target queue.

16. The computer program product of claim 15, wherein the computer-executable instructions further cause the queue flushing processor to be configured to:
determine whether the target queue is in a normal-queue linked list of a scheduler, wherein the scheduler is configured to schedule a queue in the normal-queue linked list;
add the target queue to a to-be-flushed-queue linked list of the scheduler when determining that the target queue is not in the normal-queue linked list of the scheduler;
flush the target queue after adding the target queue to the to-be-flushed-queue linked list of the scheduler; and
flush the target queue when determining that the target queue is in the normal-queue linked list of the scheduler.

17. The computer program product of claim 16, wherein the computer-executable instructions further cause the queue flushing processor to be configured to:
read queue identifiers of all currently enqueued queues in one or more of the normal-queue linked list and the to-be-flushed-queue linked list; and
receive, after reading the queue identifiers of all the currently enqueued queues in one or more of the normal-queue linked list and the to-be-flushed-queue linked list, a flushing complete indication from a dequeueing processor, wherein the flushing complete indication indicates that all of the currently enqueued queues that need to be flushed in one or more of the normal-queue linked list and the to-be-flushed-queue linked list are flushed.

18. The computer program product of claim 17, wherein the computer-executable instructions further cause the queue flushing processor to be configured to:
read a first queue identifier of a first queue in one or more of the normal-queue linked list and the to-be-flushed-queue linked list;
send a flushing check request for the first queue identifier to the dequeueing processor after reading the first queue identifier of the first queue in one or more of the normal-queue linked list and the to-be-flushed-queue linked list, wherein the flushing check request instructs the dequeueing processor to check a flushing status of the first queue, and the first queue is any one of all the currently enqueued queues in one or more of the normal-queue linked list and the to-be-flushed-queue linked list;
receive a flushing check result from the dequeueing processor, wherein the flushing check result indicates whether the first queue is to be flushed;
dequeue the first queue from one or more of the normal-queue linked list and the to-be-flushed-queue linked list,
read, after dequeueing the first queue from one or more of the normal-queue linked list and the to-be-flushed-queue linked list, a queue identifier of a next queue of the first queue in one or more of the normal-queue linked list and the to-be-flushed-queue linked list when the flushing check result indicates that the first queue is to be flushed and the dequeueing processor has an available flushing engine for flushing the first queue;
add the first queue to the to-be-flushed-queue linked list when the flushing check result indicates that the first queue is to be flushed and the dequeueing processor has no available flushing engine for flushing the first queue;
read a queue identifier of a next queue of the first queue in one or more of the normal-queue linked list and the to-be-flushed-queue linked list when the flushing check result indicates that the first queue is to be flushed and the dequeueing processor has no available flushing engine for flushing the first queue; and read a queue identifier of a next queue of the first queue in one or more of the normal-queue linked list and the to-be-flushed-queue linked list when the flushing check result indicates that the first queue is not to be flushed.

19. The computer program product of claim 15, wherein the computer-executable instructions further cause the queue flushing processor to be configured to:

receive a flushing command for at least one queue; and record, in the queue information table, a flushing status of at least one of the queues as the status of to be flushed.

20. The computer program product of claim 19, wherein the computer-executable instructions further cause the queue flushing processor to be configured to:

discard a data packet when the data packet is enqueued into at least one of the queues; and discard a data packet scheduling instruction when receiving the data packet scheduling instruction for at least one of the queues.

* * * * *